(12) United States Patent
Matsumoto et al.

(10) Patent No.: US 12,515,796 B2
(45) Date of Patent: Jan. 6, 2026

(54) CONTROL DEVICE, UNMANNED AERIAL VEHICLE, AND CONTROL METHOD

(71) Applicant: Rakuten Group, Inc., Tokyo (JP)

(72) Inventors: Asaki Matsumoto, Tokyo (JP); Tatsuhiro Seki, Tokyo (JP); Takayoshi Inuma, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 219 days.

(21) Appl. No.: 18/358,266

(22) Filed: Jul. 25, 2023

(65) Prior Publication Data

US 2024/0043118 A1 Feb. 8, 2024

(30) Foreign Application Priority Data

Jul. 28, 2022 (JP) ................. 2022-120603

(51) Int. Cl.
*B64D 1/22* (2006.01)
*B64U 20/00* (2023.01)
*B64U 101/30* (2023.01)
*B64U 101/66* (2023.01)

(52) U.S. Cl.
CPC ............ *B64D 1/22* (2013.01); *B64U 20/00* (2023.01); *B64U 2101/30* (2023.01); *B64U 2101/66* (2023.01)

(58) Field of Classification Search
CPC ... B64D 1/22; B64D 1/00; B64D 1/08; B64D 9/00; B64U 20/00; B64U 2101/30; B64U 2101/66; B64U 2101/64; B64U 10/20; B64U 10/13; B64U 2101/60
See application file for complete search history.

(56) References Cited

U.S. PATENT DOCUMENTS

| 10,071,804 | B1 | 9/2018 | Buchmueller et al. |
| 2017/0267347 | A1 | 9/2017 | Rinaldi et al. |
| 2019/0193856 | A1* | 6/2019 | Prager ............... B64D 1/22 |
| 2021/0011492 | A1 | 1/2021 | Raabe et al. |
| 2021/0214082 | A1 | 7/2021 | Inuma et al. |
| 2022/0048621 | A1 | 2/2022 | Tazume |

FOREIGN PATENT DOCUMENTS

| EP | 3070045 A1 * | 9/2016 | ........ B66D 1/76 |
| EP | 3885259 A1 | 9/2021 | |
| JP | 2021-160887 A | 10/2021 | |
| WO | 2019126698 A1 | 6/2019 | |
| WO | 2019/186713 A1 | 10/2019 | |
| WO | 2021/095249 A1 | 5/2021 | |

* cited by examiner

*Primary Examiner* — Alan D Hutchinson
(74) *Attorney, Agent, or Firm* — Sughrue Mion, PLLC

(57) ABSTRACT

A control device 133 acquires distance information indicating a distance between an UAV 1 and an article B positioned under the UAV 1 and controls a winch 16 to unreel a linear member 15 on the basis of the distance indicated in the acquired distance information.

19 Claims, 12 Drawing Sheets

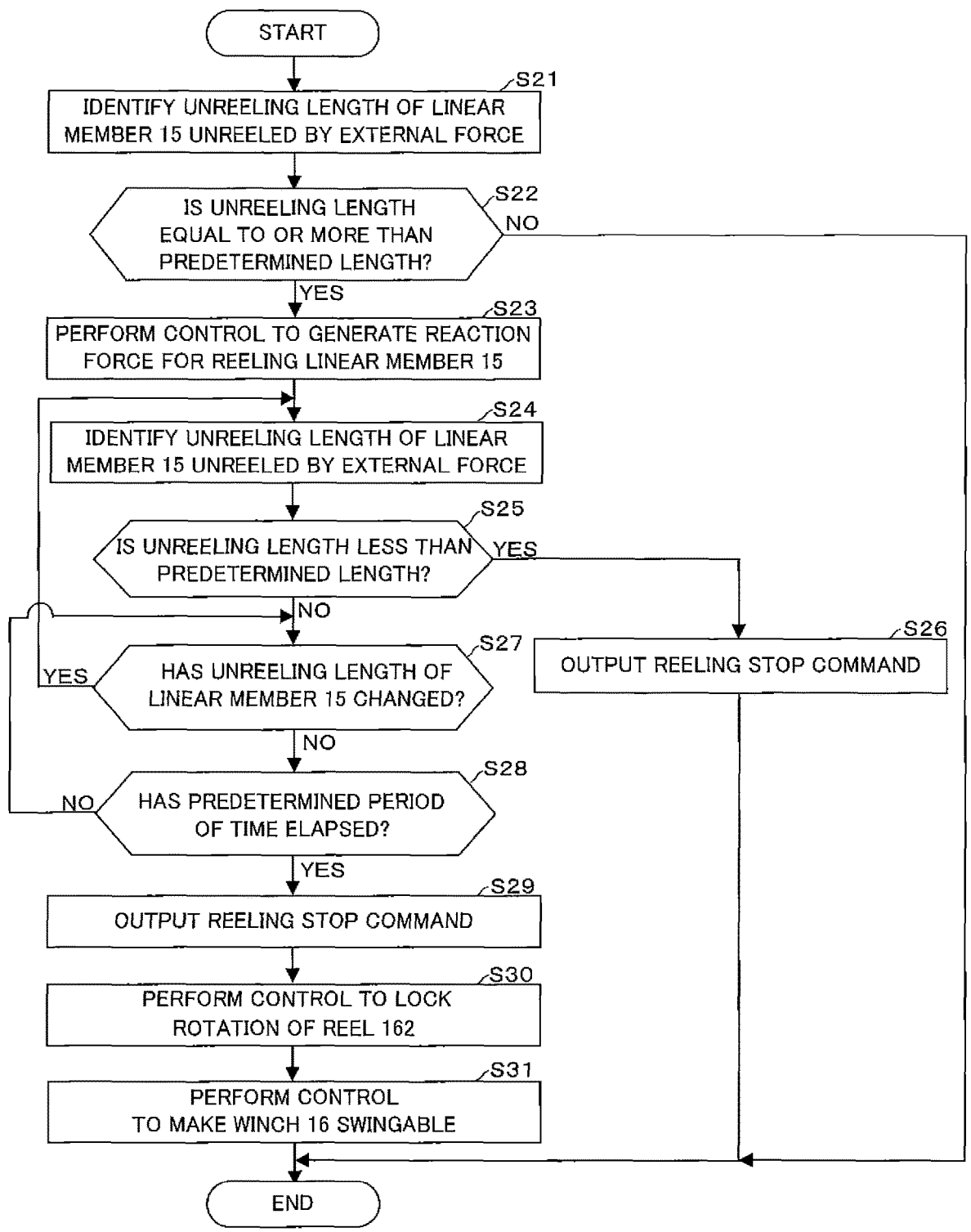

CONTROL DEVICE, UNMANNED AERIAL VEHICLE, AND CONTROL METHOD

CROSS REFERENCE TO RELATED APPLICATION

This application claims priority from Japanese Patent Application No. 2022-120603 which was filed on Jul. 28, 2022, the disclosure of which is herein incorporated by reference in its entirety.

TECHNICAL FIELD

One or more embodiments of the present invention relates to a method and other fields for attaching an article to an unmanned aerial vehicle in a system for delivering the article by the unmanned aerial vehicle.

RELATED ART

In the related art, a method for efficiently attaching an article to an unmanned aerial vehicle such as a drone has been proposed in a system for delivering the article by the unmanned aerial vehicle. For example, JP 2021-160887 A discloses a system for quickly and efficiently supplying a delivery object to a drone at a delivery station for objects to be delivered by drones. In the system disclosed in JP 2021-160887 A, a takeoff-and-landing device where drones are parked has an openable bottom surface, and an elevating device where delivery objects are placed is installed under the opening. A delivery object is attached to a drone through the opening by raising the delivery object with the elevating device.

However, the related art does not disclose a method for enabling an unmanned aerial vehicle equipped with a winch (reeling machine) to attach an article by the winch.

SUMMARY

Therefore, one or more embodiments of the present invention are to providing a control device, an unmanned aerial vehicle, and a control method that enable a staff to appropriately attach an article to an unmanned aerial vehicle by controlling a winch included in the unmanned aerial vehicle.

Solution to Issue (An aspect 1) In response to the above issue, a control device is configured to control a winch of an unmanned aerial vehicle including an attachment member capable of attaching to an article, a linear member connected to the attachment member, and the winch capable of unreeling and reeling the linear member. The control device includes: at least one memory configured to store program code; and at least one processor configured to access the program code and operate as instructed by the program code. The program code includes: acquisition code configured to cause the at least one processor to acquire distance information indicating a distance between the unmanned aerial vehicle and the article positioned under the unmanned aerial vehicle; and control code configured to cause the at least one processor to control the winch to unreel the linear member on the basis of the distance indicated in the distance information.

(An aspect 2) The program code further may include determination code configured to cause the at least one processor to determine an unreeling length of the linear member on the basis of the distance indicated in the distance information. The control code may cause the at least one processor to control the winch to unreel the linear member according to the determined unreeling length.

(An aspect 3) The acquisition code may cause the at least one processor to acquire the distance information more than once in a time series, and the control code may cause the at least one processor to control the winch to unreel the linear member until a time when the distance indicated in the distance information becomes equal to a predetermined distance.

(An aspect 4) The control code may cause the at least one processor to, in a state where a distance between the attachment member and the article or a connection member provided on the article is equal to a predetermined distance, control the winch to generate a reaction force for reeling the linear member when the linear member is further unreeled by an external force.

(An aspect 5) The control code may cause the at least one processor to, in the state where the distance between the attachment member and the article or the connection member provided on the article is equal to the predetermined distance, control the winch to generate a reaction force balanced with gravity acting on the linear member subjected to the unreeling and on the attachment member.

(An aspect 6) The reaction force for reeling the linear member may be larger than gravity acting on the linear member subjected to the unreeling and on the attachment member.

(An aspect 7) The control code may cause the at least one processor to control the winch to lock the unreeling of the linear member when the distance between the attachment member and the article or the connection member provided on the article reaches the predetermined distance.

(An aspect 8) The control code may cause the at least one processor to, in a state where the unreeling of the linear member is locked, and when a predetermined external force is detected by an external force detector included in the unmanned aerial vehicle, control the winch to release the lock and controls the winch to generate a reaction force equal to or more than gravity acting on the linear member subjected to the unreeling and on the attachment member.

(An aspect 9) The control code may cause the at least one processor to, when the linear member is further unreeled by an external force after releasing the lock, control the winch to generate the reaction force until the distance between the attachment member and the article or the connection member provided on the article returns to the predetermined distance and lock the unreeling of the linear member when the distance returns to the predetermined distance.

(An aspect 10) The control code may cause the at least one processor to control the winch to unreel the linear member until a vertical position of the attachment member corresponds to a vertical position of a connection member provided on the article on the basis of the distance indicated in the distance information.

(An aspect 11) The control code may cause the at least one processor to, in a state where the vertical position of the attachment member corresponds to the vertical position of the connection member provided on the article, control the winch to generate a reaction force balanced with gravity acting on the linear member subjected to the unreeling and on the attachment member.

(An aspect 12) The control code may cause the at least one processor to control the winch to lock the linear member to prevent unreeling when the vertical position of the attachment member corresponds to the vertical position of the connection member provided on the article.

(An aspect 13) The control code may cause the at least one processor to, in a state where the winch is controlled to generate the reaction force, control the winch to lock the unreeling of the linear member when an unreeling length of the linear member does not change for a predetermined period of time.

(An aspect 14) The winch may include an attachment portion to be attached to the unmanned aerial vehicle, and the winch may be attached to the unmanned aerial vehicle with the attachment portion as a fulcrum so as to be swingable or non-swingable by the external force. The control code may cause the at least one processor to, in a state where the winch is unable to swing by the external force, and when the unreeling of the linear member is locked, control the attachment portion to enable the winch to swing.

(An aspect 15) The winch may include an attachment portion to be attached to the unmanned aerial vehicle, and the winch may be attached to the unmanned aerial vehicle with the attachment portion as a fulcrum so as to be swingable or non-swingable by the external force. The control code may cause the at least one processor to: in a state where the linear member is able to be unreeled by the external force, control the attachment portion to disable swinging of the winch; and in a state where the linear member is unable to be unreeled by the external force, control the attachment portion to enable the winch to swing.

(An aspect 16) The distance indicated in the distance information may be a distance between the attachment member and the article or a connection member provided on the article.

(An aspect 17) The acquisition code may cause the at least one processor to acquire information indicating a height of the article and a height of the unmanned aerial vehicle relative to a placement surface where the article is placed and acquire the distance information on the basis of each of the heights.

(An aspect 18) The unmanned aerial vehicle may include a sensor configured to measure the distance, and the acquisition code may cause the at least one processor to acquire the distance information from the sensor.

(An aspect 19) An unmanned aerial vehicle includes: an attachment member capable of attaching to an article; a linear member connected to the attachment member; a winch capable of unreeling and reeling the linear member; at least one memory configured to store program code; and at least one processor configured to access the program code and operate as instructed by the program code. The program code includes: acquisition code configured to cause the at least one processor to acquire distance information indicating a distance between the unmanned aerial vehicle and the article positioned under the unmanned aerial vehicle; and control code configured to cause the at least one processor to control the winch to unreel the linear member on the basis of the distance indicated in the distance information.

(An aspect 20) A control method is executed by a computer for controlling a winch of an unmanned aerial vehicle including an attachment member capable of attaching to an article, a linear member connected to the attachment member, and the winch capable of unreeling and reeling the linear member. The control method includes: acquiring distance information indicating a distance between the unmanned aerial vehicle and the article positioned under the unmanned aerial vehicle; and controlling the winch to unreel the linear member on the basis of the distance indicated in the distance information.

BRIEF DESCRIPTION OF THE DRAWINGS

FIG. 12 is a flowchart illustrating an exemplary processing of the control processing unit 1335 in an unreeling operation of the linear member 15 by an external force.

DETAILED DESCRIPTION

An unmanned aerial vehicle (hereinafter referred to as "UAV (Unmanned Aerial Vehicle)") according to one or more embodiments of the invention will now be described with reference to the drawings.

[1. Configuration and Operation Outline of UAV 1]

Figure 1:
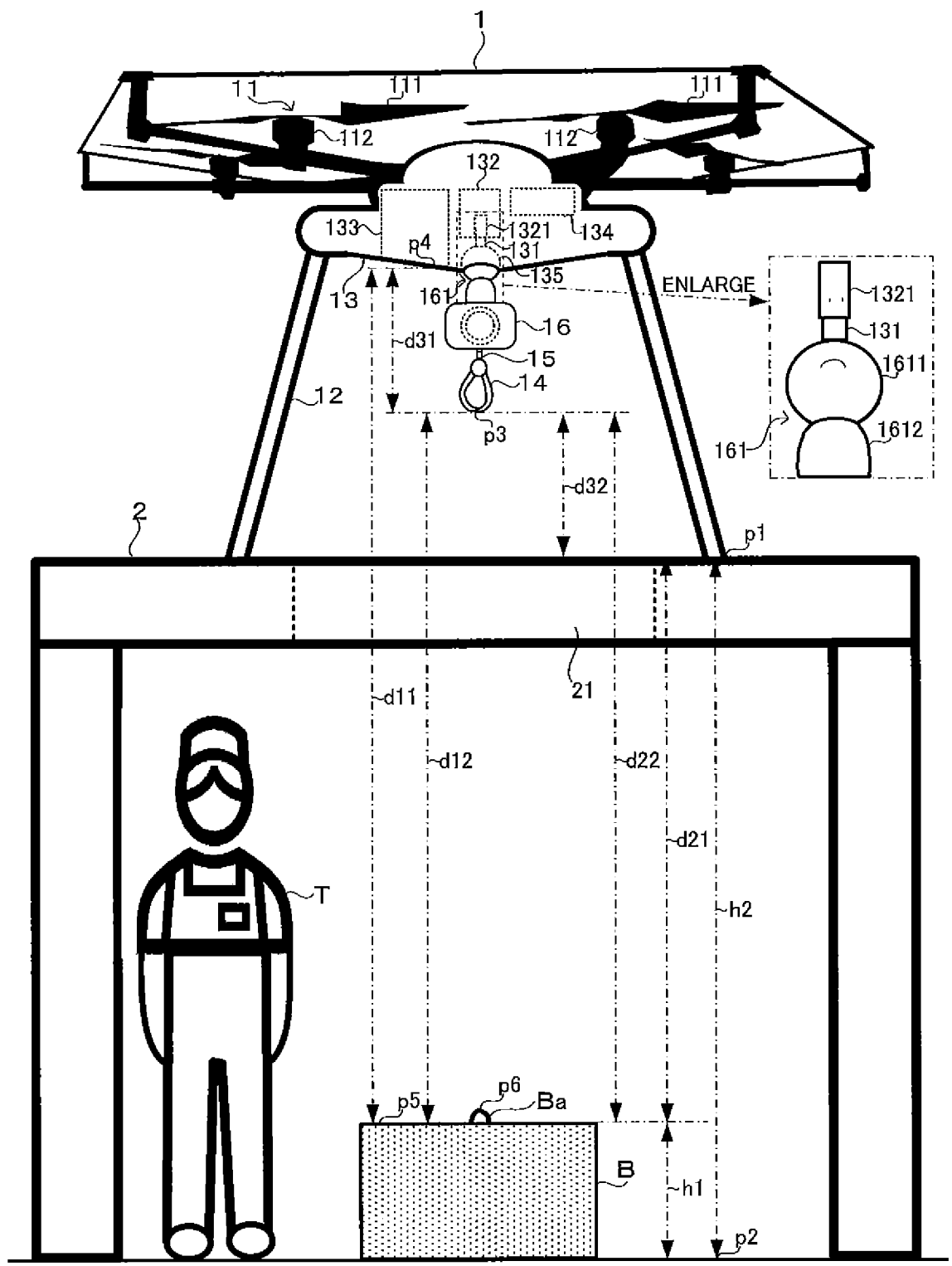
FIG. 1 is a diagram illustrating an example of an exterior of an UAV 1 landing on a platform 2.

First, a configuration and an operation outline of an UAV 1 according to this embodiment will be roughly described with reference to FIG. 1 and the like. FIG. 1 is a diagram illustrating an example of the exterior of the UAV 1 landing on a platform 2. The UAV 1 is also referred to as a drone or a multi-copter. The platform 2 is installed in a spot (for example, a store or a logistics hub) where an article B to be delivered by the UAV 1 is attached to the UAV 1. The platform 2 is provided with an opening 21 through which the article B passes. The article B to be delivered as a cargo (load) is not particularly limited and may be, for example, items (e.g., products) or parcels ordered from EC (Electronic Commerce) sites or home delivery sites or may be aid and relief supplies provided to shelters or the like. Alternatively, the article B may be a storage object (for example, a delivery box) for storing one or more of the aforementioned products, parcels or supplies.

Incidentally, the article B varies in size (length×width× height). For this reason, articles B of different sizes cannot be appropriately attached to drones by the technique disclosed in the related art. For example, in the related art, when a placement part is elevated to the height of a drone port layer, a large-sized article B and a small-sized article B have different distances between themselves and a drone, which makes it is difficult to appropriately perform an article attaching operation. However, according to the present embodiments, it is possible to appropriately attach articles B of different sizes.

As illustrated in FIG. 1, the UAV 1 includes, for example, a rotor unit 11, legs 12, a body 13, an attachment member 14 capable of attaching to the article B, a linear member 15 connected to one end of the attachment member 14, and a winch 16 capable of unreeling and reeling the linear member 15. The linear member 15 is a winch line. Examples of the linear member 15 include a rope or a wire or the like. Examples of the attachment member 14 include a hook or a shackle or the like. The attachment member 14 may be a mooring member 14 capable of mooring to the article B. The article B is attached to the attachment member 14 by a staff T (for example, a store clerk or a worker) at the spot. To enable the staff T to appropriately attach the article B to the attachment member 14, the article B is preferably provided with a connection member Ba for connecting the article B to the attachment member 14 as illustrated in FIG. 1. The connection member Ba may be regarded as a part of the article B. Incidentally, FIG. 1 illustrates an example where a person who is the staff T performs the work of attaching the article B. However, a mechanical device such as a robot including a sensor, a control mechanism, and a drive mechanism may performs the work of attaching the article B as a staff.

The rotor unit 11 includes a plurality of rotors (propellers) 111, or horizontal rotary blades, and rotor drive mechanisms 112. The rotor drive mechanisms 112 include, for example, rotating shafts (not illustrated) connected to the rotors 111 and an actuator (not illustrated) for rotating the rotors 111 via the rotating shafts. The actuator (including a motor) is controlled by a control device 133 to be described. Incidentally, a lower end of each leg 12 is in contact with an upper surface p1 of the platform 2.

The body 13 includes a swing restrainer 131, a swing restrainer drive mechanism 132, the control device 133, and a battery 134. The swing restrainer drive mechanism 132 includes, for example, a hollow acceptor 1321 configured to house at least a part of the swing restrainer 131 and an actuator (not illustrated) configured to slide the swing restrainer 131 up and down inside the acceptor 1321. The actuator is controlled by the control device 133. The acceptor 1321 is fixed in the body 13.

The winch 16 includes a swing unit 161 as an example of an attachment portion to be attached to the UAV 1 (body 13). The winch 16 is attached to the UAV 1 with the swing unit 161 as a fulcrum so as to be swingable or non-swingable by an external force. In other words, the swing unit 161 functions as an oscillation mechanism of the winch 16 and is switchable between swinging (oscillating) mode and non-swinging (non-oscillating) mode. Incidentally, the external force is, for example, a force [N] generated when the linear member 15 (attachment member 14) is pulled by the staff T, and a force larger than gravity (in other words, the loads of the linear member 15 and the attachment member 14) acting on the linear member 15 unreeled (unwound) from a reel 162 to be described and on the attachment member 14. The gravity is a product of the mass m of the unreeled linear member 15 and the attachment member 14 and the gravitational acceleration g. The gravity increases with an increase in unreeling length of the linear member 15.

The swing unit 161 includes a ball 1611 and a support 1612 configured to support the ball 1611. A part (for example, an upper portion and a central portion) of the ball 1611 is rollably (e.g., swingably) fitted (in other words, mated) with a ball bearing 135 provided in the body 13, and the ball 1611 is prevented from falling off the body 13. Moreover, the upper portion of the ball 1611 can contact with or be fitted with the swing restrainer 131. Incidentally, the body 13 may be provided with a plurality of swing restrainers 131. In this case, the upper portion of the ball 1611 can contact with the plurality of swing restrainers 131, or be fitted with the plurality of swing restrainers 131.

When the swing restrainer 131 is slid downward by the actuator of the swing restrainer drive mechanism 132, a lower end portion of the swing restrainer 131 abuts on (presses) an upper end portion of the ball 1611, and a frictional force generated on a contact surface between the swing restrainer 131 and the ball 1611 prevents the swing unit 161 from swinging, whereby the swing unit 161 becomes unable to swing (or oscillate). On the other hand, when the swing restrainer 131 is slid downward by the actuator of the swing restrainer drive mechanism 132, the lower end portion of the swing restrainer 131 is fitted into a groove (not illustrated) disposed in the upper end portion of the ball 1611, whereby the swing unit 161 is prevented from swinging and becomes unable to swing (or oscillate). In contrast, when the swing restrainer 131 is slid upward by the actuator of the swing restrainer drive mechanism 132, the swing restrainer 131 is separated from the ball 1611, whereby the swing unit 161 is freed from the swing restraint and becomes able to swing (or oscillate). Incidentally, a lower end portion of the ball 1611 is fixed (for example, attached with a screw) to an upper end portion of the support 1612.

Figure 2:
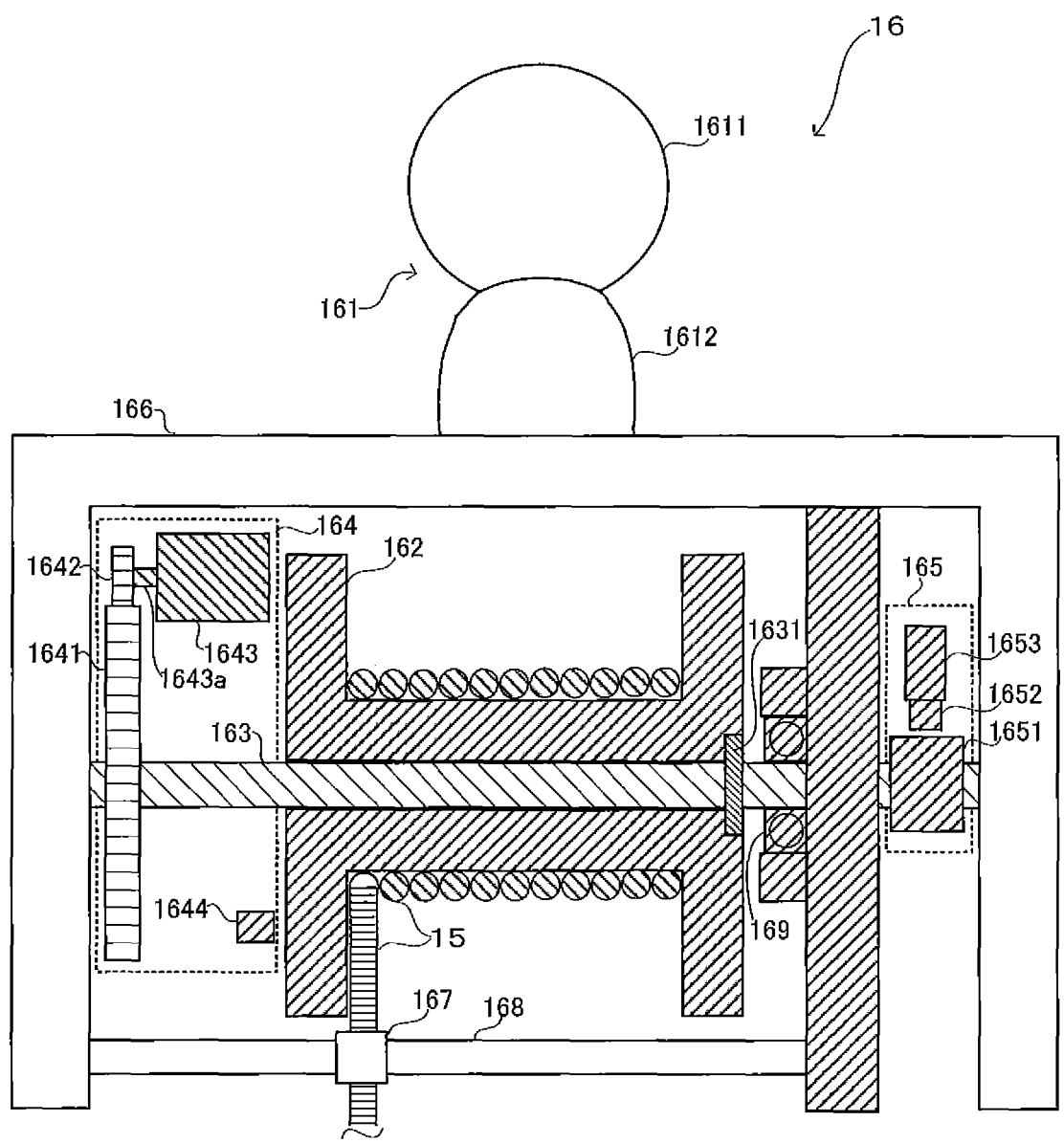
FIG. 2 is a schematic cross-sectional view illustrating an example of schematic configuration of a winch 16.

FIG. 2 is a schematic cross-sectional view illustrating an example of a configuration of the winch 16. In addition to the swing unit 161, the winch 16 includes, for example, the reel 162 around which the linear member 15 is wound, a rotating shaft 163 inserted into the reel 162, a reel drive mechanism 164 configured to rotationally drive the reel 162 and the rotating shaft 163, a reel rotation lock mechanism 165 configured to lock the rotation of the reel 162 and the rotating shaft 163, and a casing 166. The casing 166 houses the reel 162, the rotating shaft 163, the reel drive mechanism 164, the reel rotation lock mechanism 165, and the like and directly or indirectly supports these components. An upper end portion of the casing 166 is fixed to a lower end portion of the support 1612 of the swing unit 161. Moreover, the casing 166 may be provided with a rod 168 to which a guide member 167 is attached. The linear member 15 is inserted through the guide member 167. The guide member 167 reciprocates along an axial direction of the rod 168 and has a function of uniformly winding the linear member 15 around the reel 162.

The reel 162 rotates (forward or backward) axially along with the rotational drive of the rotating shaft 163. For example, the linear member 15 wound around the reel 162 is unreeled from the initial position by the forward rotation of the reel 162. In contrast, the backward rotation of the reel 162 causes the unreeled linear member 15 to be reeled and wound around the reel 162. Moreover, the reel 162 is preferably prevented from rotating relative to the rotating shaft 163 by an engagement member 1631 radially protruding from the rotating shaft 163. The rotating shaft 163 is rotatably supported by a bearing 169 attached to the casing 166.

The reel drive mechanism 164 includes, for example, a gear 1641, a gear 1642 meshing with the gear 1641, a drive motor 1643 controlled by the control device 133, and a force detection sensor 1644 (an example of an external force detector). Incidentally, the reel drive mechanism 164 may include another gear besides the gear 1641 and the gear 1642. Moreover, the force detection sensor 1644 detects not only an external force but also gravity acting on the linear member 15 (that is, subjected to the unreeling) unreeled from the reel 162 and on the attachment member 14. On the other hand, the center of the gear 1641 is fixed to the rotating shaft 163. The center of the gear 1642 is fixed to a rotating shaft 1643a of the drive motor 1643. Alternatively, the center of the gear 1642 may be connected via a shaft coupling (not illustrated). Moreover, the drive motor 1643 driven by the control device 133 rotationally drives the rotating shaft 163 via the gears 1641 and 1642. That is, torque (turning force) generated by the driven drive motor 1643 is transmitted to the rotating shaft 163 via the gears 1641 and 1642, whereby the reel 162 rotates forward or backward.

Moreover, at a timing (in other words, at a moment) when unreeling of the linear member 15 by unreeling control (motor control) from the control device 133 stops (the timing to be described later), mode switching is performed so as to unreel the linear member 15 by an external force (or to drag the linear member 15 by an external force). That is, mode of unreeling the linear member 15 by the unreeling control is switched to mode of unreeling the linear member 15 by an external force. After the mode switching, the reel 162 is rotated by an external force generated by pulling the linear member 15. The external force is detected by the force detection sensor 1644, and force information indicating the detected external force is output to the control device 133. Examples of the force detection sensor 1644 include a tension sensor that detects the tension received by the unreeled linear member 15 and a strain gauge attached to a member that is deformed by a force acting on the unreeled linear member 15 and the attachment member 14.

Incidentally, the winch 16 may be provided with a rotation frequency detection sensor configured to detect a rotation frequency (or may detect a rotation angle) of the reel 162. The rotation frequency detection sensor detects a rotation frequency of the reel 162 by, for example, detecting a mark inside the casing 166. Rotation frequency information indicating the rotation frequency detected by the rotation frequency detection sensor is output to the control device 133. Moreover, the winch 16 may be provided with an unreeling length measurement sensor configured to measure an unreeling length of the linear member 15 unreeled from the reel 162. Here, the unreeling length (amount) of the linear member 15 is a length of the linear member 15 unreeled from the reel 162. Unreeling length information indicating the unreeling length measured by the unreeling length measurement sensor is output to the control device 133.

Moreover, after the mode switching to enable unreeling of the linear member 15 by an external force, the reel 162 is possibly rotated by gravity acting on the unreeled linear member 15 (that is, subjected to the unreeling) and the attachment member 14, and the linear member 15 is possibly unreeled. In order to prevent this situation, the reel drive mechanism 164 or the reel rotation lock mechanism 165 is preferably controlled by the control device 133 as described later.

The reel rotation lock mechanism 165 includes, for example, a rotator 1651 fixed to the rotating shaft 163, a rotation restrainer 1652 for restraining the rotation of the rotator 1651, a hollow acceptor 1653 housing at least a part of the rotation restrainer 1652, and an actuator (not illustrated) for sliding the rotation restrainer 1652 up and down inside the acceptor 1653. The actuator is controlled by the control device 133. The acceptor 1653 is fixed in the casing 166. Incidentally, the reel rotation lock mechanism 165 may include a plurality of rotation restrainers 1652.

When the rotation restrainer 1652 is slid downward by the actuator of the reel rotation lock mechanism 165, a lower end portion of the rotation restrainer 1652 abuts on (presses) an upper end portion of the rotator 1651, and a frictional force generated on a contact surface between the rotator 1651 and the rotation restrainer 1652 prevents the rotator 1651 from rotating, whereby the rotation of the reel 162 is locked (that is, the reel 162 becomes unable to rotate). As a result, the unreeling of the linear member 15 is locked (in other words, the linear member 15 is locked to prevent the unreeling). Alternatively, when the rotation restrainer 1652 is slid downward by the actuator of the reel rotation lock mechanism 165, the lower end portion of the rotation restrainer 1652 is fitted into a groove (not illustrated) disposed in the upper end portion of the rotator 1651 and the rotator 1651 is prevented from rotating, whereby the reel 162 is locked and made unrotatable.

On the other hand, when the rotation restrainer 1652 is slid upward by the actuator of the reel rotation lock mechanism 165, the rotation restrainer 1652 is separated from the rotator 1651 and the rotator 1651 is freed from the rotation restraint, thereby releasing the rotation lock of the reel 162. As a result, the unreeling lock of the linear member 15 is released. Incidentally, in place of the rotation restrainer 1652 and the acceptor 1653, the reel rotation lock mechanism 165 may include an electromagnetic brake capable of restraining the rotation of the rotator 1651 using an electromagnetic force generated by energizing a coil. Moreover, in a state where the rotation of the reel 162 is not locked (in other words, a state where it is possible to unreel the linear member 15 by an external force), the winch 16 is not able to swing. In contrast, in a state where the rotation of the reel 162 is locked (in other words, a state where it is impossible to unreel the linear member 15 by an external force), the winch 16 is able to swing.

Figure 3:
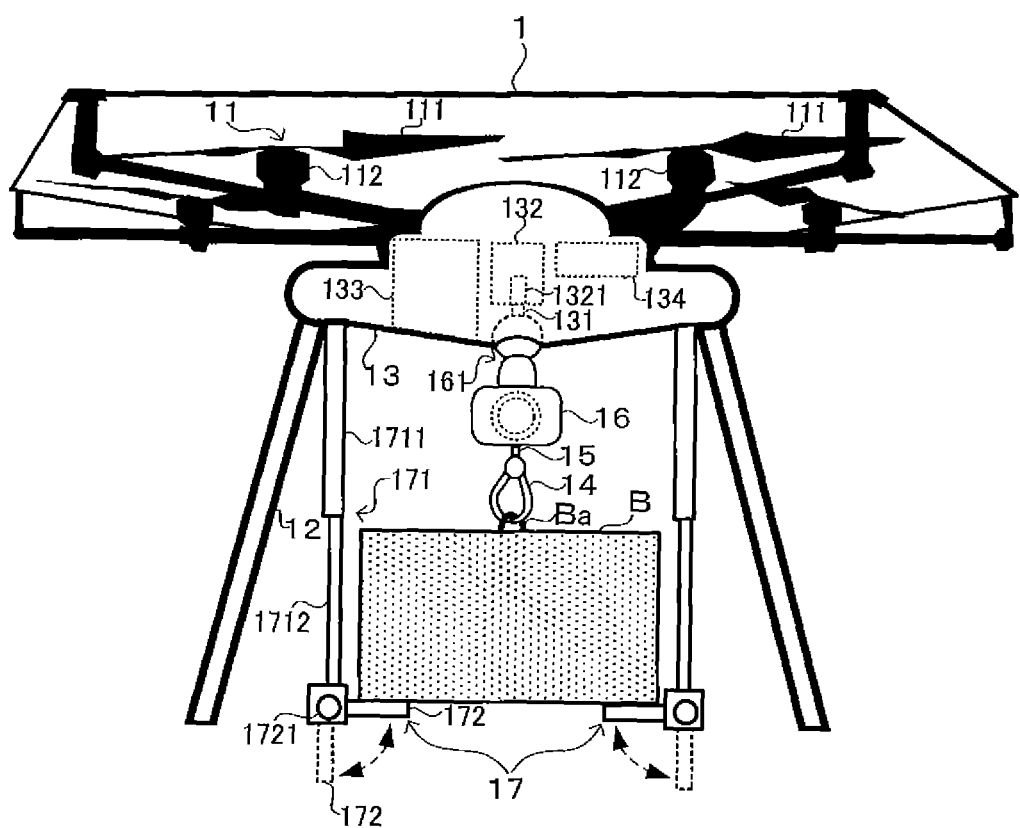
FIG. 3 is a drawing illustrating an example of an exterior of the UAV 1 including an article holding mechanism 17.

Incidentally, in addition to the above components, the UAV 1 may include an article holding mechanism for holding the article B. FIG. 3 is a drawing illustrating an example of the exterior of the UAV 1 including an article holding mechanism 17. The article holding mechanism 17 includes, for example, telescopic members 171, movable holders 172, and an actuator (not illustrated). The telescopic members 171 include, for example, hollow upper members 1711 and lower members 1712 insertably connected to the upper members 1711. Upper end portions of the upper members 1711 are fixed to the body 13, and lower end portions of the lower members 1712 are fixed to the movable holders 172. In a state where the article B is not held, the lower members 1712 are inserted into hollow portions of the upper members 1711 under control of the control device 133. The movable holders 172 are openable and closable under control of the control device 133, centering on rotating shafts 1721 as indicated by dashed arrows. When the movable holders 172 are in the closed state as indicated by solid lines in FIG. 3, the article B (bottom part) is held (supported). With this configuration, the article B is prevented from falling. In contrast, when the movable holders 172 are in the open state as indicated by dashed lines in FIG. 3, the article B cannot be held.

Figure 4:
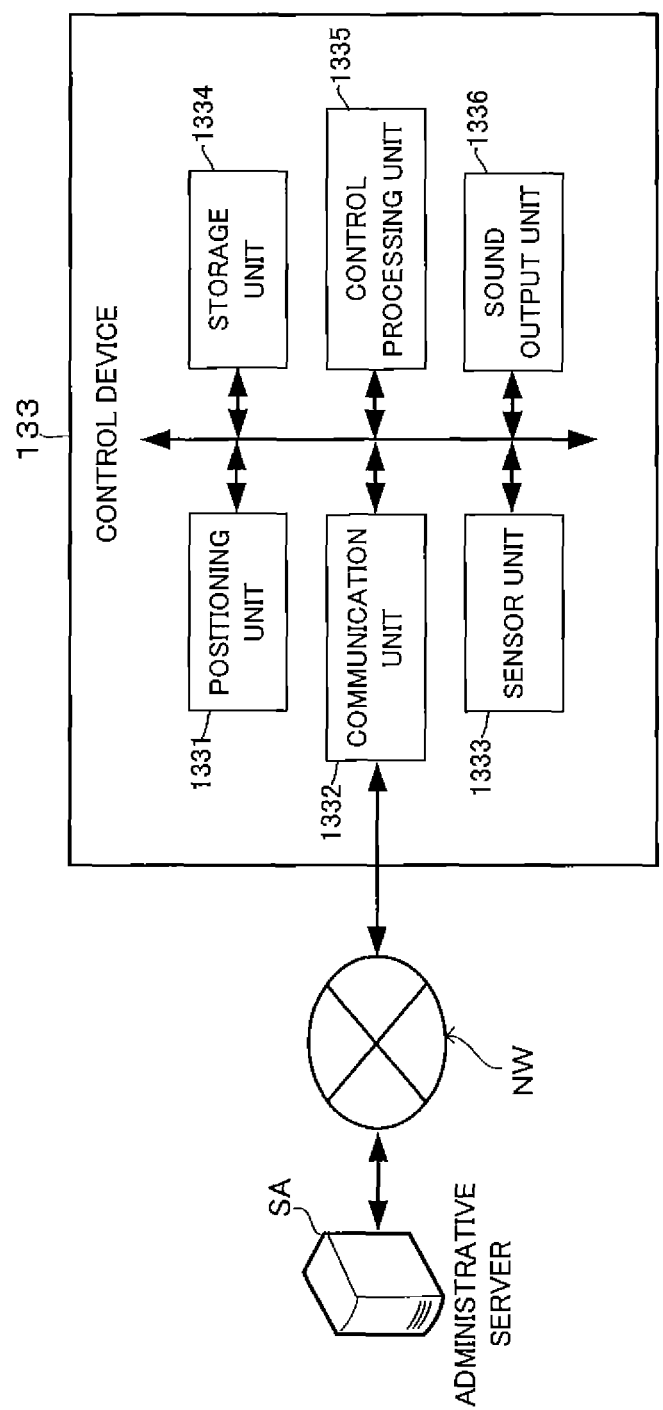
FIG. 4 is a drawing illustrating an example of a schematic configuration of a control device 133.

FIG. 4 is a drawing illustrating an example of a schematic configuration of the control device 133. The control device 133 includes, for example, a positioning unit 1331, a communication unit 1332, a sensor unit 1333, a storage unit 1334, a control processing unit 1335, and a sound output unit 1336. Power is supplied from the battery 134 to these units. The positioning unit 1331 includes, for example, a radio receiver and an altitude sensor. The positioning unit 1331 receives, for example, a radio wave transmitted from a satellite of GNSS (Global Navigation Satellite System) by the radio receiver and detects a horizontal current position (latitude and longitude) of the UAV 1 on the basis of the radio wave. Location information indicating the current position detected by the positioning unit 1331 is output to the control processing unit 1335. Furthermore, the positioning unit 1331 may detect a vertical current position (altitude) of the UAV 1 by the altitude sensor such as an atmospheric pressure sensor. In this case, the location information includes altitude information indicating the altitude of the UAV 1.

The communication unit 1332 has a wireless communication function and is responsible for controlling communication over a communication network NW. Examples of the communication network NW include the Internet, a mobile communication network, and a radio base station thereof. Through the communication unit 1332, the UAV 1 communicates with an administrative server SA connected to the communication network NW. The administrative server SA is a server that administers (manages) the delivery of the article B. The administrative server SA administers and controls the UAV 1. Moreover, the communication unit 1332 performs near field communication with an operating terminal (not illustrated) used by the staff T.

The sensor unit 1333 includes various sensors used for, for example, flight control of the UAV 1. Examples of the various sensors include an optical sensor, a triaxial angular rate sensor, a triaxial acceleration sensor, and a geomagnetic sensor. The optical sensor includes a camera (for example, RGB camera) and continuously captures images of a real space within an angle of view of the camera. Sensing information sensed (for example, captured or measured) by the sensor unit 1333 is output to the control processing unit 1335. The sensing information may be sequentially transmitted to the administrative server SA by the communication unit 1332 together with a vehicle ID of the UAV 1. The vehicle ID of the UAV 1 is identification information for identifying the UAV 1.

Moreover, the optical sensor may include not only the camera but also a distance sensor capable of measuring a distance to the article B. An example of the distance sensor includes a LiDAR (Light Detection and Ranging or Laser Imaging Detection and Ranging) sensor. Alternatively, the distance sensor may be a meter configured to measure a distance (depth) by emitting near-infrared light and measuring a time from when the light is reflected from the article B to when the light returns. In a case where the article B is provided with the connection member Ba, a distance between the UAV 1 and the connection member Ba provided on the article B (that is, the connection member Ba of the article B) may be measured. Incidentally, the distance sensor may be attached to the legs 12, the attachment member 14, or the winch 16 (for example, outside the casing 166). Particularly, in a case where the distance sensor is attached to the attachment member 14, a distance between the attachment member 14 of the UAV 1 and the article B (or the connection member Ba of the article B) can be measured accurately.

The storage unit 1334 includes a nonvolatile memory and the like and stores various programs (program code group) and data. Moreover, the storage unit 1334 stores the vehicle ID of the UAV 1. The control processing unit 1335 includes, for example, at least one CPU (Central Processing Unit), a ROM (Read Only Memory), and a RAM (Random Access Memory) and executes various kinds of processing according to programs stored in the ROM (or the storage unit 1334). Incidentally, the control processing unit 1335 is electrically connected to the rotor drive mechanisms 112, the swing restrainer drive mechanism 132, the reel drive mechanism 164, and the reel rotation lock mechanism 165. The CPU (an example of processor) is configured to access the program code stored in the ROM or the storage unit 1334. The program code includes: acquisition code configured to cause the CPU to acquire distance information indicating a distance between the UAV 1 and the article B positioned under the UAV 1; and control code configured to cause the CPU to control the winch 16 to unreel the linear member 15 on the basis of the distance indicated in the distance information. The program code further may include: determination code configured to cause the CPU to determine an unreeling length of the linear member 15 on the basis of the distance indicated in the distance information.

Figure 5:
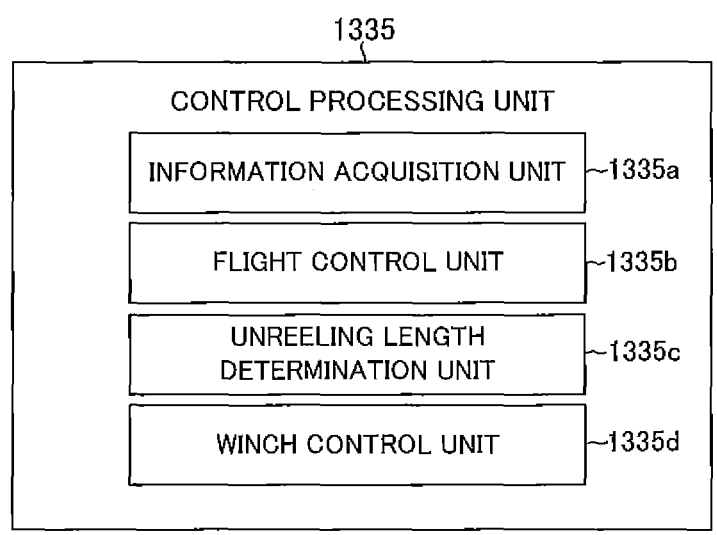
FIG. 5 is a diagram illustrating an example of a functional block in a control processing unit 1335.

FIG. 5 is a diagram illustrating an example of a functional block in the control processing unit 1335. In accordance with the programs (program code group) stored in the ROM or the storage unit 1334, for example, the control processing unit 1335 functions as an information acquisition unit 1335a (example of an acquisition unit), a flight control unit 1335b, an unreeling length determination unit 1335c (example of a determination unit), and a winch control unit 1335d (example of a control unit) as illustrated in FIG. 5.

The information acquisition unit 1335a acquires distance information indicating a distance (interval) between the UAV 1 and the article B positioned under the UAV 1. For example, in a case where the sensor unit 1333 includes a distance sensor, the information acquisition unit 1335a may acquire distance information indicating a distance d11 measured by the distance sensor from the sensor unit 1333 in a state where the UAV 1 is landing on the platform 2 as illustrated in FIG. 1. As a result, it is possible to quickly acquire the distance information indicating the distance d11 between the UAV 1 and the article B. Incidentally, in the example illustrated in FIG. 1, the article B is positioned directly under the winch 16 of the UAV 1 but is not necessarily positioned directly under. For example, the position of the article B may be shifted horizontally by several tens of centimeters from the position directly under the winch 16 of the UAV 1.

Moreover, the information acquisition unit 1335a may identify a distance d31 (vertical distance) between an attachment point p4 of the distance sensor and a lower end p3 of the attachment member 14 before the linear member 15 is unreeled. In this case, the information acquisition unit 1335a acquires distance information indicating a length obtained by subtracting the identified distance d31 from the distance d11 measured by the distance sensor as a distance d12 between the UAV 1 and the article B. Here, information indicating the distance d31 is preferably acquired from size information of the UAV 1. The size information of the UAV 1 is stored in advance, for example, in the storage unit 1334. In this case, the information acquisition unit 1335a acquires the size information of the UAV 1 from the storage unit 1334. Alternatively, the information acquisition unit 1335a may acquire the size information of the UAV 1 from the administrative server SA by referring to the administrative server SA for the size information. Alternatively, the distance d31 may be measured by using the unreeling length measurement sensor.

Incidentally, after the unreeling of the linear member 15 is started, the information acquisition unit 1335a may acquire, from the sensor unit 1333, time-series distance information indicating the distance d31 measured more than once by the sensor. In this case, the information acquisition unit 1335a identifies the distance d31 between the attachment point p4 of the distance sensor and the lower end p3 of the attachment member 14 and acquires lengths obtained by subtracting each of the identified distance d31 from the distance d11 as distance information indicating each of the distance d12 between the UAV 1 and the article B.

Alternatively, as illustrated in FIG. 1, the information acquisition unit 1335a may acquire information indicating a height h1 of the article B and a height h2 of the UAV 1 vehicle relative to a placement surface p2 (for example, the ground or rooftop of a building) where the article B is placed (for example, the upper surface p1 of the platform 2) and calculate a distance d21 between the UAV 1 and the article B on the basis of the heights h1 and h2, thereby obtaining distance information. Accordingly, even though the UAV 1 is not provided with a distance sensor, it is possible to acquire distance information indicating the distance d21 between the UAV 1 and the article B. For example, a length obtained by subtracting the height h1 of the article B from the height h2 to the UAV 1 is calculated as the distance d21 between the UAV 1 and the article B. Moreover, the information acquisition unit 1335a may identify a distance d32 (vertical distance) between the upper surface p1 of the platform 2 and the lower end p3 of the attachment member 14 before the linear member 15 is unreeled. In this case, the information acquisition unit 1335a acquires distance information indicating a length obtained by adding the identified distance d32 to the calculated distance d21 as a distance d22 between the UAV 1 and the article B. Here, information indicating the distance d32 is preferably acquired from the size information of the UAV 1, similarly to the information indicating the distance d31.

The information indicating the height h1 of the article B is preferably acquired from article information of the article B. For example, the information acquisition unit 1335a acquires the article information by reading through the camera a two-dimensional code (such as QR code (registered trademark)) assigned to each article B and shown on an upper surface of each article B. Incidentally, the information acquisition unit 1335a may acquire the article information of the article B from the administrative server SA by referring to the administrative server SA for the article information. Alternatively, in a case where the article B is the storage object described above, the information indicating the height h1 of the article B may be acquired from size information of the storage object. For example, in a case where the size of the storage object is determined to be one in advance, size information indicating the size of the storage object is stored in the storage unit 1334 in advance. In this case, the information acquisition unit 1335a acquires the size information from the storage unit 1334.

On the other hand, in a case where there are storage objects of two or more sizes, size information associated with a type ID for identifying each size is preferably stored in the storage unit 1334 in advance. In this case, the information acquisition unit 1335a acquires the type ID by reading a two-dimensional code shown on an upper surface of the storage object through the camera and acquires the size information associated with the acquired type ID from the storage unit 1334. Incidentally, the information acquisition unit 1335a may acquire the size information of the storage object from the administrative server SA by referring to the administrative server SA for the size information. On the other hand, information indicating the height h2 up to the UAV 1 is stored in, for example, the storage unit 1334 in advance. In this case, the information acquisition unit 1335a acquires the information indicating the height h2 from the storage unit 1334. Alternatively, the information indicating the height h2 may be acquired from the administrative server SA.

The flight control unit 1335b performs flight control (including take-off control and landing control) for flying the UAV 1 to a destination. In the flight control, the rotation frequency of the rotors 111, the position, attitude, traveling direction, and the like of the UAV 1 are controlled using the location information acquired from the positioning unit 1331, the sensing information acquired from the sensor unit 1333, destination information, and the like. As a result, the UAV 1 can autonomously fly to a destination and land at the destination. Here, the destination information is acquired from the administrative server SA by, for example, the information acquisition unit 1335a. The destination information includes, for example, location information (latitude and longitude) of the destination. Examples of the destination include a spot where the article B is attached to the UAV 1 (such as logistics hub) or a spot where the article B is released from the UAV 1 (such as logistics hub and delivery location).

The unreeling length determination unit 1335c determines an unreeling length of the linear member 15 on the basis of a distance indicated in the distance information acquired by the information acquisition unit 1335a. For example, a length obtained by subtracting a predetermined distance from a distance indicated in the distance information (any one of d11, d12, d21, and d22) is determined by the unreeling length determination unit 1335c as the unreeling length of the linear member 15. Here, the predetermined distance is an appropriate distance for enabling the staff T to quickly and appropriately attach the article B to the attachment member 14 of the UAV 1. Alternatively, the predetermined distance is a distance at which the staff T receives a feeling of user-friendliness when attaching the article B to the attachment member 14 of the UAV 1. For example, in a case where the distance d12 or the distance d22 indicated in the distance information is used, the predetermined distance may be set to about several centimeters (larger than 0 cm) to 20 cm. On the other hand, in a case where the distance d11 or the distance d21 indicated in the distance information is used, the distance d31 or d32 is considered, and the predetermined distance is preferably set in such a manner that the distance between the attachment member 14 of the UAV 1 and the article B or the connection member Ba of the article B falls within the range of about several centimeters to 20 cm. Incidentally, the unreeling length determination unit 1335c may determine an unreeling length of the linear member 15 using a length obtained by subtracting a height of the connection member Ba of the article B from a distance indicated in the distance information as the distance between the UAV 1 and the article B.

On the basis of the distance indicated in the distance information acquired by the information acquisition unit 1335a, the winch control unit 1335d controls the winch 16 to unreel the linear member 15 from the initial position (that is, the reel 162 is rotated). As a result, the unreeling length of the linear member 15 can be changed depending on the distance between the UAV 1 and the article B, which enables the winch 16 to unreel an appropriate length of the linear member 15 regardless of the size (particularly, the height) of the article B. Moreover, the staff T can appropriately attach the article B to the UAV 1 using the linear member 15 and the attachment member 14. For example, the winch control unit 1335d controls the reel drive mechanism 164 of the winch 16 to unreel the linear member 15 according to the unreeling length determined by the unreeling length determination unit 1335c. As a result, it is possible to make the winch 16 unreel an appropriate length of the linear member 15 efficiently. Incidentally, the unreeling of the linear member 15 is stopped at the timing when the determined unreeling length of the linear member 15 is unreeled.

Here, a correspondence relation between the unreeling length of the linear member 15 and the rotation frequency (or rotation angle) of the reel 162 is preferably determined in advance (for example, a rotation frequency of "0.05 (18 degrees)" corresponds to an unreeling length of "x cm"). In this case, to the reel drive mechanism 164 of the winch 16, the winch control unit 1335d outputs a control signal for rotating the reel 162 forward at a rotation frequency corresponding to the unreeling length determined by the unreeling length determination unit 1335c according to the correspondence relation. As a result, the drive motor 1643 in the reel drive mechanism 164 is driven, whereby the linear member 15 corresponding to the unreeling length is unreeled from the reel 162. When the unreeling of the linear member 15 is stopped, the mode of unreeling the linear member 15 by the unreeling control from the winch control unit 1335d is switched to the mode of unreeling the linear member 15 by an external force. The winch control unit 1335d may cause the sound output unit 1336 to output a sound indicating the completion of the mode switching (for example, an alert sound or a voice message is output from a speaker).

Moreover, in a case where the distance between the UAV 1 and the article B is measured by the distance sensor, on the basis of the time-series distance information acquired more than once by the information acquisition unit 1335a, the winch control unit 1335d may control the reel drive mechanism 164 of the winch 16 to unreel the linear member 15 until a time when the distance indicated in the distance information reaches (that is, becomes equal to) the predetermined distance. That is, the unreeling of the linear member 15 is stopped at the timing when the distance (d11 or d12) indicated in the distance information reaches the predetermined distance. In this case, an appropriate unreeling length of the linear member 15 can be unreeled without using the unreeling length determination unit 1335c. As a result, it is possible to make the winch 16 unreel an appropriate length of the linear member 15 accurately.

Figure 6:
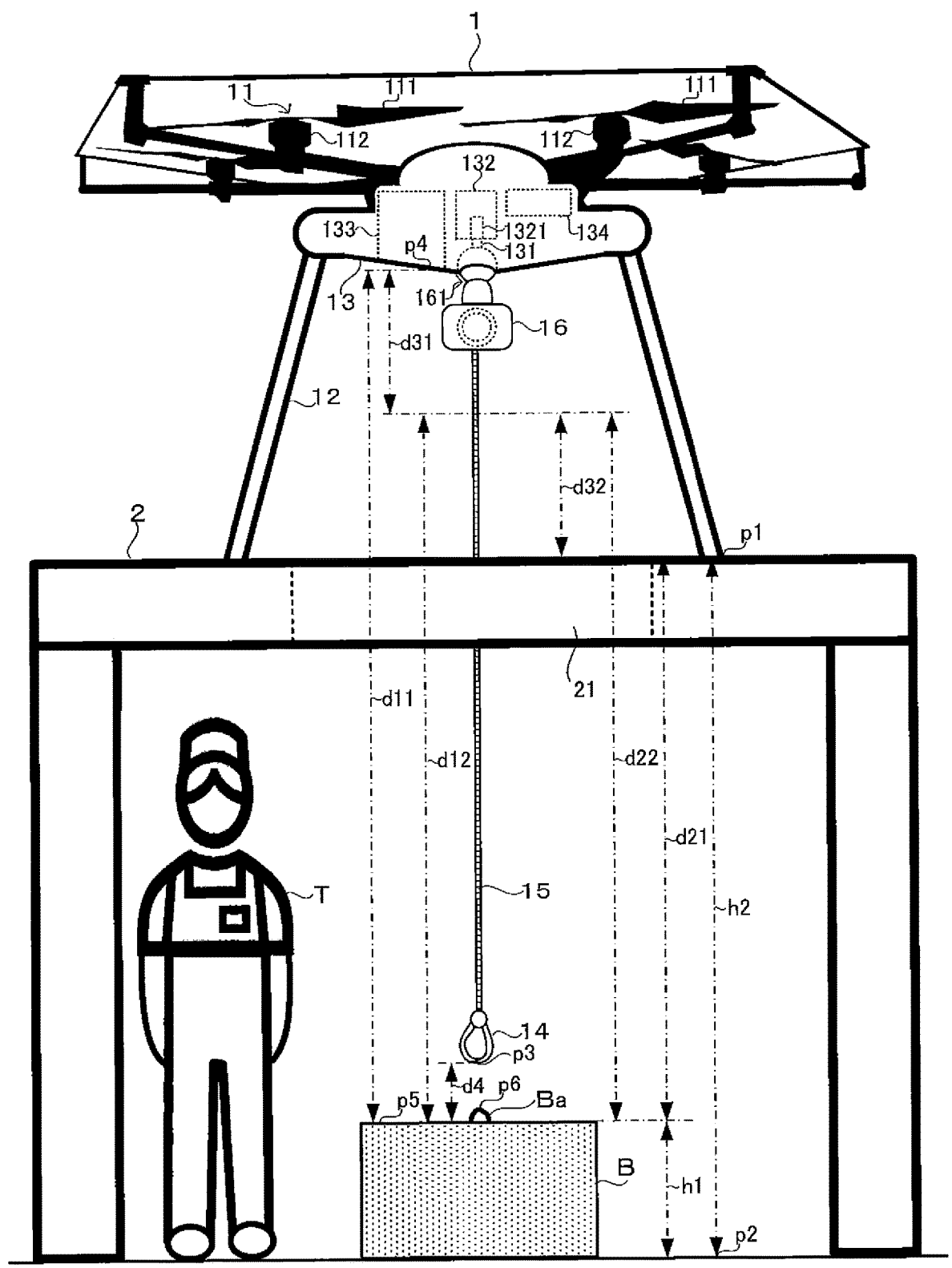
FIG. 6 is a view illustrating a state where a distance between an attachment member 14 of the UAV 1 and an article B becomes equal to a predetermined distance d4 due to a linear member 15 being unreeled by an unreeling control from a winch control unit 1335d.

FIG. 6 is a view illustrating a state where the distance between the attachment member 14 of the UAV 1 and the article B becomes equal to a predetermined distance d4 (for example, 10 cm) due to the linear member 15 being unreeled by the unreeling control from the winch control unit 1335d. In the example illustrated in FIG. 6, since the attachment member 14 of the UAV 1 stops at a point some distance above the article B, it is possible to reduce the possibility that the linear member 15 (attachment member 14) unreeled by the unreeling control from the winch control unit 1335d comes into contact with the article B and damages the article B. Therefore, it is possible to control the reel drive mechanism 164 of the winch 16 to unreel the linear member 15 at an unreeling rate faster than another example different from FIG. 6 (to be described later). As a result, the staff T can attach the article B to the UAV 1 more quickly and appropriately. Furthermore, since the staff T can attach the article B to the UAV 1 (the attachment member 14) by dragging the linear member 15, the staff T feels that the user-friendliness is enhanced as compared with a case where the staff T attaches the article B to the UAV 1 (the attachment member 14) in a state where (in other words, while) the linear member 15 is sagging due to excessive unreeling. Moreover, it is possible to solve problems caused by unnecessary unreeling of the linear member 15 (for example, a problem of accidentally attaching the attachment member 14 to another article and a problem of entangling linear members of adjacent UAVs 1). Incidentally, in the example illustrated in FIG. 6, the predetermined distance d4 is a distance from the lower end p3 of the attachment member 14 to an upper surface p5 of the article B after the linear member 15 is unreeled, but the predetermined distance d4 may be a distance from the lower end p3 of the attachment member 14 to an upper end p6 of the connection member Ba of the article B.

As another example different from FIG. 6, the winch control unit 1335d may perform the unreeling control to make a vertical position of the attachment member 14 of the UAV 1 (a height of the article B from the placement surface p2) substantially equal to a vertical position of the connection member Ba of the article B. In this case, the winch control unit 1335d controls the reel drive mechanism 164 of the winch 16 to unreel the linear member 15 (for example, the determined unreeling length of the linear member 15) of the UAV 1 until the vertical position of the attachment member 14 of the UAV 1 corresponds to the vertical position of the connection member Ba of the article B on the basis of the distance indicated in the distance information. Here, the expression "the vertical position of the attachment member 14 corresponds to the vertical position of the connection member Ba of the article B" represents that, for example, the lower end p3 of the attachment member 14 comes within the range from the upper surface p5 of the article B to the upper end p6 of the connection member Ba. As a result, the staff T can appropriately attach the article B to the UAV 1 without dragging the linear member 15 as compared with the linear member 15 illustrated in FIG. 6. However, in this case, since the linear member 15 is unreeled to bring the attachment member 14 into contact with the article B, it is desirable to limit the unreeling rate of the linear member 15 as compared with the example of FIG. 6 so as not to damage the article B. That is, the winch control unit 1335d preferably controls the reel drive mechanism 164 of the winch 16 to unreel the linear member 15 at an unreeling rate (speed) lower than the unreeling rate in the example of FIG. 6. As a result, the attachment member 14 can be slowly brought into contact with the article B.

Incidentally, even in a case where the distance between the UAV 1 and the article B is measured by the distance sensor, the winch control unit 1335d may control the reel drive mechanism 164 of the winch 16 to unreel the linear member 15 of the UAV 1 until the vertical position of the attachment member 14 of the UAV 1 corresponds to the vertical position of the connection member Ba of the article B on the basis of the time-series distance information acquired more than once by the information acquisition unit 1335a.

As described above, in a state where (in other words, while) the distance between the attachment member 14 of the UAV 1 and the article B or the connection member Ba of the article B is equal to a predetermined distance (for example, 10 cm) due to the linear member 15 being unreeled by the unreeling control from the winch control unit 1335*d* (that is, in a state where the unreeling of the linear member 15 is stopped), when the linear member 15 is further unreeled by an external force, the winch control unit 1335*d* preferably controls the reel drive mechanism 164 of the winch 16 to generate a reaction force for reeling the linear member 15. As a result, the distance between the attachment member 14 of the UAV 1 and the article B or the connection member Ba of the article B is kept to the predetermined distance, thereby reducing the possibility that the article is damaged by the attachment member 14 coming into contact with the article B. Moreover, generating the reaction force for reeling the linear member 15 prevents the linear member 15 from sagging which is caused by the staff T excessively dragging the linear member 15 when attaching the article B, and the staff T receives a feeling of user-friendliness. Incidentally, the reaction force for reeling the linear member 15 is a force in a direction opposite to the gravity acting on the linear member 15 unreeled by the unreeling control from the winch control unit 1335*d* and on the attachment member 14, and the reaction force is larger than the gravity.

Figure 7:
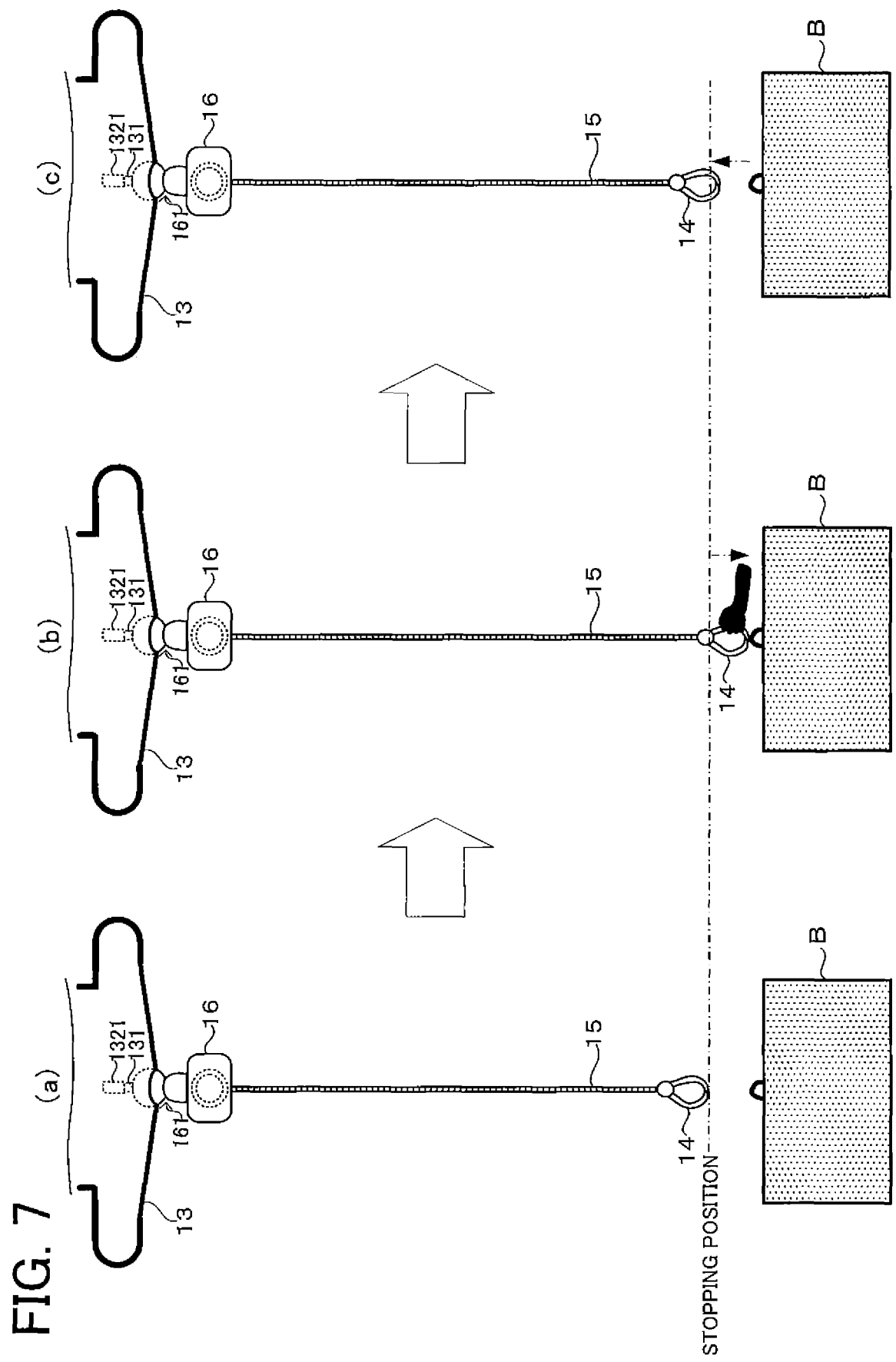
FIG. 7 is a view illustrating a state (a) where the unreeling of the linear member 15 is stopped, a state (b) where the linear member 15 is further unreeled by an external force, and a state (c) where the linear member 15 is reeled when the external force disappears with the article B not being attached to the attachment member 14.

FIG. 7 is a view illustrating a state (a) where the unreeling of the linear member 15 is stopped, a state (b) where the linear member 15 is further unreeled by an external force, and a state (c) where the linear member 15 is reeled when the external force disappears with the article B not being attached to the attachment member 14 (the state transfers from the state (a) to the state (c) as indicated by arrows). In the control to generate the reaction force for reeling the linear member 15, the winch control unit 1335*d* outputs to the reel drive mechanism 164 of the winch 16 a control signal for generating torque in the drive motor 1643 corresponding to the reaction force. The control is performed until the distance between the attachment member 14 of the UAV 1 and the article B or the connection member Ba of the article B returns to the predetermined distance. As a result, even when the linear member 15 is unreeled by the staff T more than necessary, the distance between the attachment member 14 and the article B or the connection member Ba of the article B automatically returns to the predetermined distance. Moreover, it is possible to solve the problems caused by unnecessary unreeling of the linear member 15 more efficiently.

Figure 8:
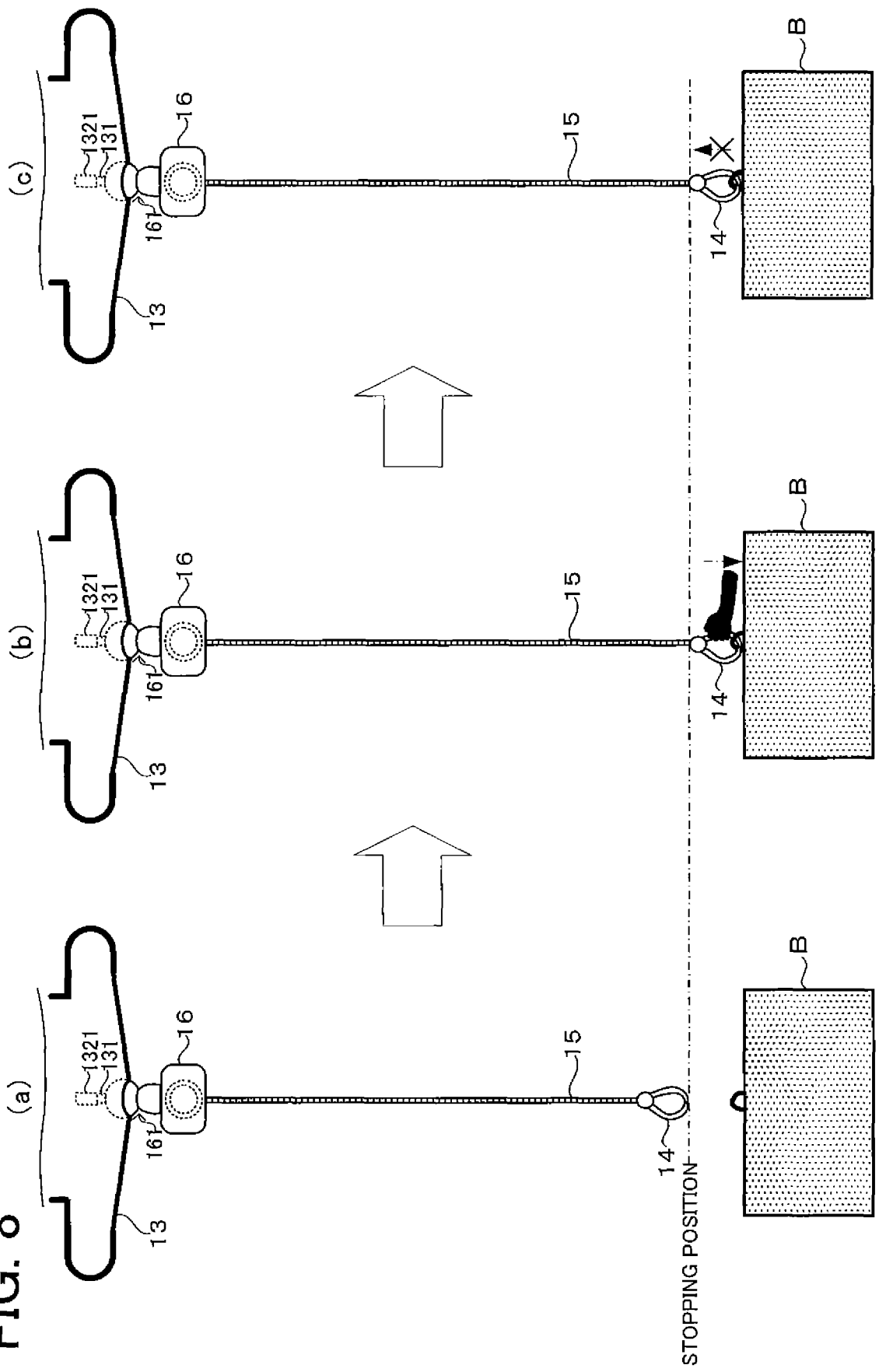
FIG. 8 is a view illustrating a state (a) where the unreeling of the linear member 15 is stopped, a state (b) where the linear member 15 is further unreeled by an external force and the article B is attached to the attachment member 14, and a state (c) where the linear member 15 is not reeled even when the external force disappears.

On the other hand, FIG. 8 is a view illustrating a state (a) where the unreeling of the linear member 15 is stopped, a state (b) where the linear member 15 is further unreeled by an external force and the article B is attached to the attachment member 14, and a state (c) where the linear member 15 is not reeled even when the external force disappears (the state transfers from the state (a) to the state (c) as indicated by arrows). Here, in the state (c), the attachment member 14 tries to return to a point where the distance between the attachment member 14 and the article B becomes equal to the predetermined distance due to the reaction force for reeling the linear member 15, but the attachment member 14 cannot return to the point. Incidentally, as will be described later, when the state (c) continues for a predetermined period of time (for example, for 10 seconds), it is determined that the attachment of the article B is completed.

Incidentally, on the basis of the force information from the force detection sensor 1644, the winch control unit 1335*d* distinguishes the gravity acting on the unreeled linear member 15 (that is, subjected to the unreeling) and the attachment member 14 from an external force generated by pulling the linear member 15. For example, the winch control unit 1335*d* recognizes a force indicated in each piece of force information continuously acquired until the unreeling length of the linear member 15 reaches a predetermined length (for example, several centimeters) (that is, until the length of the linear member 15 reaches a length at which the linear member 15 is possibly not pulled) as the gravity acting on the unreeled linear member 15 (that is, subjected to the unreeling) and the attachment member 14. The force indicated in the force information gradually varies (increases) according to the unreeling length of the linear member 15, and a force indicated in the force information at the timing when the variation of the force becomes equal to or more than a threshold is recognized by the winch control unit 1335*d* as the external force generated by pulling the linear member 15.

By the way, as described above, after the mode switching to unreel the linear member 15 by an external force, in a case where the reel 162 is rotated by the gravity acting on the linear member 15 subjected to the unreeling and the attachment member 14 and the linear member 15 is unreeled, the winch control unit 1335*d* preferably prevents the unreeling of the linear member 15 by controlling the reel drive mechanism 164 or the reel rotation lock mechanism 165 of the winch 16.

For example, in a state where the distance between the attachment member 14 of the UAV 1 and the article B or the connection member Ba of the article B is equal to the predetermined distance by the unreeling control from the winch control unit 1335*d*, the winch control unit 1335*d* controls the reel drive mechanism 164 of the winch 16 to generate a reaction force balanced with the gravity acting on the linear member 15 subjected to the unreeling in this state and the attachment member 14. In this control, the winch control unit 1335*d* outputs to the reel drive mechanism 164 of the winch 16 a control signal for causing the drive motor 1643 to generate torque corresponding to the reaction force balanced with the gravity acting on the linear member 15 subjected to the unreeling and the attachment member 14 in this state. As a result, when no external force is applied to the linear member 15 and the attachment member 14, it is possible to maintain the state where the distance between the attachment member 14 of the UAV 1 and the article B or the connection member Ba of the article B is equal to the predetermined distance, and it is possible to further unreel the linear member 15 by an external force.

Incidentally, even when the vertical position of the attachment member 14 of the UAV 1 corresponds to the vertical position of the connection member Ba of the article B, the winch control unit 1335*d* may control the reel drive mechanism 164 of the winch 16 to generate the reaction force balanced with the gravity acting on the linear member 15 subjected to the unreeling and the attachment member 14 in this state. As a result, it is possible to maintain the state where the vertical position of the attachment member 14 of the UAV 1 corresponds to the vertical position of the connection member Ba of the article B.

As another example of preventing the unreeling of the linear member 15, when the winch control unit 1335*d* performs the unreeling control and the distance between the attachment member 14 of the UAV 1 and the article B or the connection member Ba of the article B reaches the predetermined distance, the winch control unit 1335*d* may control the reel rotation lock mechanism 165 of the winch 16 to lock the rotation of the reel 162 (in other words, to lock the unreeling of the linear member 15). In this control, the winch control unit 1335d outputs a control signal for sliding the rotation restrainer 1652 downward to the reel rotation lock mechanism 165 of the winch 16. As a result, when no external force is applied to the linear member 15 and the attachment member 14, it is possible to maintain the predetermined distance between the attachment member 14 of the UAV 1 and the article B or the connection member Ba of the article B.

Moreover, in a state where the rotation of the reel 162 is locked (in other words, the reel 162 is locked and unrotatable), when a predetermined external force (for example, an external force equal to or more than a threshold) is detected by the force detection sensor 1644, the winch control unit 1335d preferably controls the reel rotation lock mechanism 165 of the winch 16 to release the lock and controls the reel drive mechanism 164 of the winch 16 to generate a reaction force (that is, at least a reaction force balanced with the gravity) equal to or more than the gravity acting on the linear member 15 unreeled before the lock and on the attachment member 14. In the control for releasing the rotation lock of the reel 162, the winch control unit 1335d outputs a control signal for sliding the rotation restrainer 1652 upward to the reel rotation lock mechanism 165 of the winch 16. As a result, since the drive motor 1643 and the like are not driven until the predetermined external force is detected, it is possible to reduce power consumption required for generating the reaction force.

When the linear member 15 is further unreeled by an external force after the rotation lock of the reel 162 is released, the winch control unit 1335d may generate the reaction force for reeling the linear member 15 until the distance between the attachment member 14 of the UAV 1 and the article B or the connection member Ba of the article B returns to the predetermined distance and may control the reel rotation lock mechanism 165 of the winch 16 to re-lock the rotation of the reel 162 when the distance returns to the predetermined distance. As a result, even when the linear member 15 is unreeled by an external force after releasing the unreeling lock of the linear member 15, it is possible to automatically return the distance between the attachment member 14 of the UAV 1 and the article B or the connection member Ba of the article B to the predetermined distance, and it is also possible to maintain the predetermined distance between the attachment member 14 of the UAV 1 and the article B or the connection member Ba of the article B.

Incidentally, even when the vertical position of the attachment member 14 of the UAV 1 corresponds to the vertical position of the connection member Ba of the article B, the winch control unit 1335d may control the reel rotation lock mechanism 165 of the winch 16 to lock the rotation of the reel 162. As a result, it is possible to maintain the state where the vertical position of the attachment member 14 of the UAV 1 corresponds to the vertical position of the connection member Ba of the article B.

Moreover, after the linear member 15 is unreeled by an external force, when the unreeling length of the linear member 15 does not change for a predetermined period of time (for example, for 10 seconds) in a state where the reel drive mechanism 164 of the winch 16 is controlled to generate the reaction force for reeling the linear member 15, the winch control unit 1335d may control the reel rotation lock mechanism 165 of the winch 16 to lock the rotation of the reel 162. As a result, when the linear member 15 is further unreeled by an external force and the attachment of the article B to the attachment member 14 of the UAV 1 is completed, it is possible to prevent the linear member 15 from being unreeled by an external force.

Moreover, when the rotation of the reel 162 is locked in a state where the winch 16 is unable to swing (or oscillate) by an external force, the winch control unit 1335d controls the swing unit 161 (swing restrainer drive mechanism 132) to enable the winch 16 to swing (or oscillate). In this control, the winch control unit 1335d outputs a control signal for sliding the swing restrainer 131 upward to the swing restrainer drive mechanism 132 of the winch 16. As a result, when the linear member 15 is to be unreeled by an external force in spite of a situation that the rotation of the reel 162 is locked by an external force (that is, a situation that it is impossible to unreel the linear member 15 by an external force), the UAV 1 itself is less likely to be affected undesirably by the external force applied to the linear member 15. Incidentally, the winch control unit 1335d controls the swing unit 161 to disable swinging (or oscillating) of the winch 16 in a situation where the rotation of the reel 162 is not locked (that is, a situation that it is possible to unreel the linear member 15 by an external force).

Figure 9:
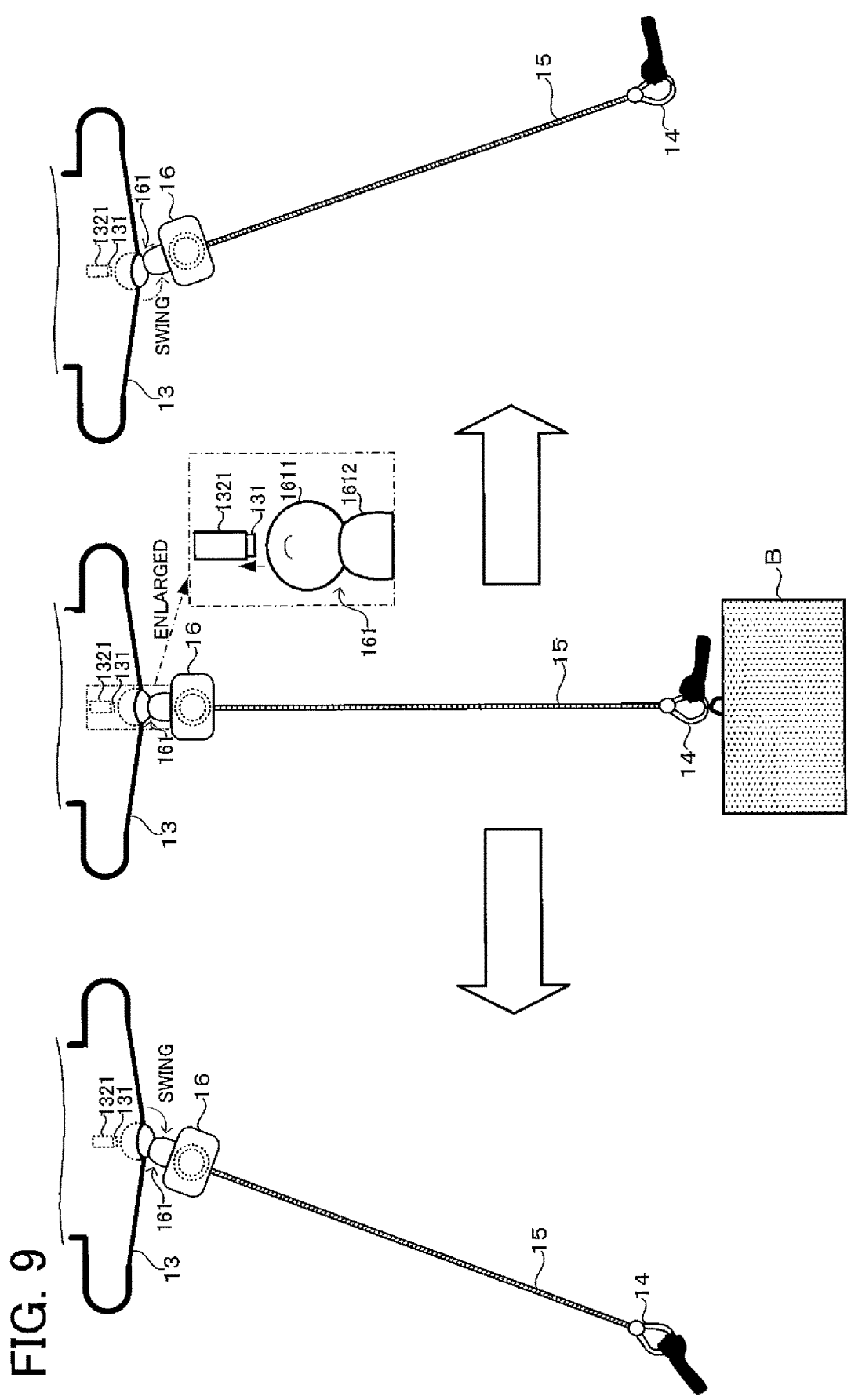
FIG. 9 is a view illustrating how the winch 16 swings in a state where a rotation of a reel 162 is locked.

FIG. 9 is a view illustrating how the winch 16 swings in a state where the rotation of the reel 162 is locked. In a state where the rotation of the reel 162 is locked, the winch control unit 1335d controls the swing unit 161 to make the winch 16 swingable as illustrated in FIG. 9. As a result, even when the staff T pulls the article B horizontally to a position directly under the winch 16 after the attachment of the article B to the attachment member 14 of the UAV 1 is completed, the UAV 1 itself is prevented from being pulled and tilted accordingly.

After the attachment of the article B to the attachment member 14 of the UAV 1 is completed, on the basis of, for example, a reeling instruction from the staff T, the winch control unit 1335d controls the reel rotation lock mechanism 165 of the winch 16 to unlock the rotation of the reel 162, controls the swing unit 161 to disable swinging of the winch 16, and controls the reel drive mechanism 164 of the winch 16 to generate the reaction force for reeling the linear member 15 to the initial position before unreeling. Incidentally, for example, the reeling instruction from the staff T may be received from the operating terminal used by the staff T via the communication unit 1332.

[2. Operation Related to Winch Control in UAV 1]

Next, an operation related to winch control in the UAV 1 will be described.

(2-1. Unreeling Operation of Linear Member 15 by Control Processing Unit 1335)

Figure 10:
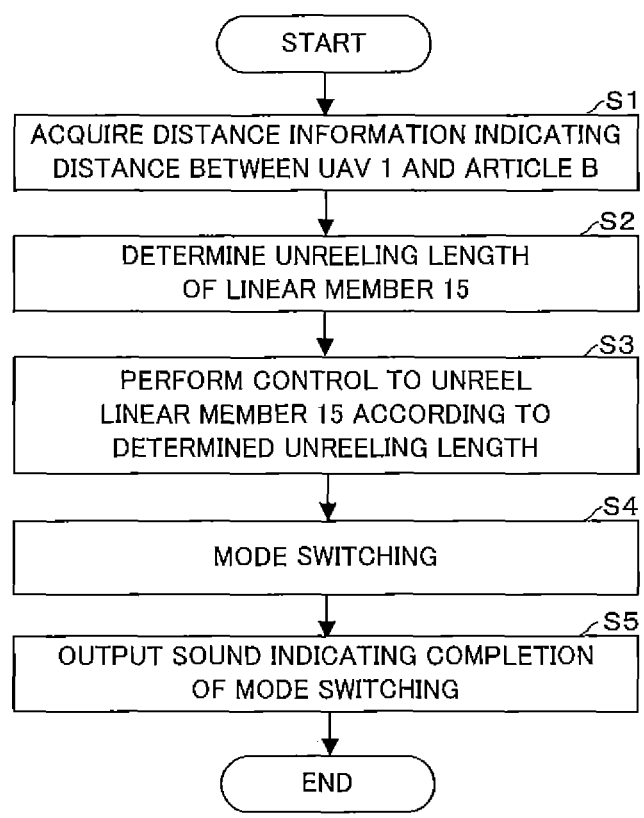
FIG. 10 is a flowchart illustrating an exemplary processing (Example 1) performed by the control processing unit 1335 in an unreeling operation of the linear member 15 by the control processing unit 1335.
Figure 11:
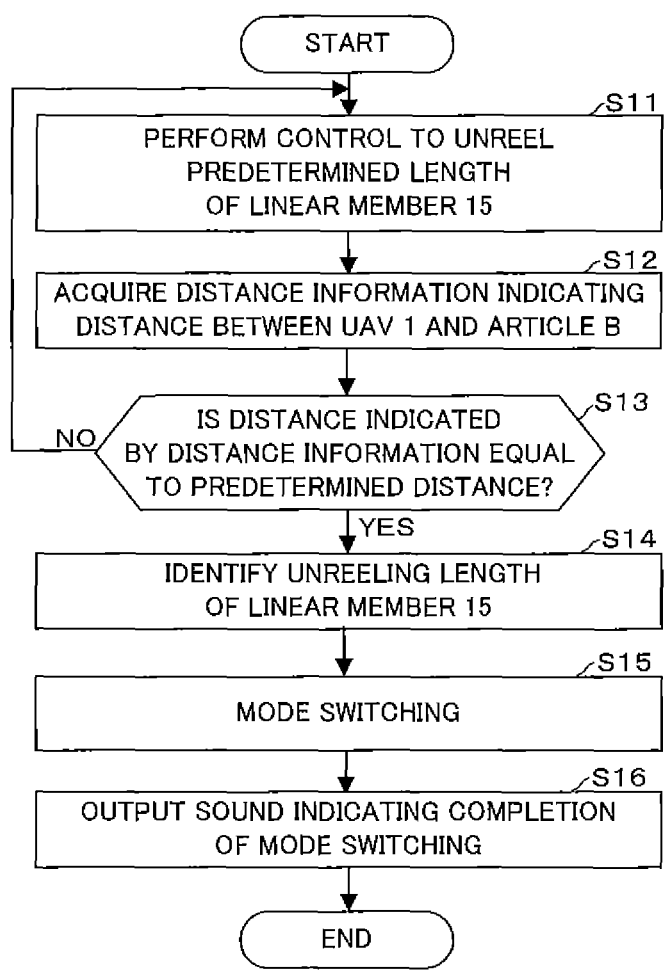
FIG. 11 is a flowchart illustrating an exemplary processing (Example 2) performed by the control processing unit 1335 in an unreeling operation of the linear member 15 by the control processing unit 1335.

First, with reference to FIGS. 10, 11, and the like, an unreeling operation of the linear member 15 by the control processing unit 1335 (winch control unit 1335d) will be described with reference to Example 1 and Example 2 separately. FIG. 10 is a flowchart illustrating an exemplary processing (Example 1) performed by the control processing unit 1335 in the unreeling operation of the linear member 15 by the control processing unit 1335. FIG. 11 is a flowchart illustrating an exemplary processing (Example 2) performed by the control processing unit 1335 in the unreeling operation of the linear member 15 by the control processing unit 1335.

Example 1

Example 1 shows an operation in a case where the unreeling length determination unit 1335c is used. After the UAV 1 lands on the platform 2 and the article B is placed at a predetermined position under the UAV 1, the processing illustrated in FIG. 10 is started in response to, for example, detection of the article B by the optical sensor of the UAV 1 or an unreeling instruction from the staff T. Incidentally, for example, the unreeling instruction from the staff T may be received from the operating terminal used by the staff T via the communication unit 1332.

When the processing illustrated in FIG. 10 is started, the control processing unit 1335 causes the information acquisition unit 1335a to acquire distance information indicating a distance between the UAV 1 and the article B (that is, a distance between the UAV 1 and the article B positioned under the UAV 1) (Step S1). For example, as described above, the information acquisition unit 1335a acquires the distance information indicating the distance between the UAV 1 and the article B measured by the distance sensor. Alternatively, the information acquisition unit 1335a may acquire information indicating a height of the article B and a height of the UAV 1 from a placement surface where the article B is placed and calculate a distance between the UAV 1 and the article B on the basis of each height so as to acquire distance information. Incidentally, the distance between the UAV 1 and the article B is preferably, for example, a distance between the attachment member 14 of the UAV 1 and the article B.

Next, the control processing unit 1335 causes the unreeling length determination unit 1335c to determine an unreeling length of the linear member 15 on the basis of the distance indicated in the distance information acquired in Step S1 (Step S2). For example, as described above, the unreeling length determination unit 1335c determines a length obtained by subtracting a predetermined distance (for example, 10 cm) from the distance indicated in the distance information as the unreeling length of the linear member 15.

Next, the control processing unit 1335 causes the winch control unit 1335d to control the reel drive mechanism 164, thereby unreeling the linear member 15 according to the unreeling length determined in Step S2 (Step S3). In this control, as described above, a control signal to make the reel 162 rotate forward at a rotation frequency corresponding to the unreeling length determined in Step S2 is output from the winch control unit 1335d to the reel drive mechanism 164. As a result, the drive motor 1643 in the reel drive mechanism 164 is driven to unreel the determined unreeling length of the linear member 15 from the reel 162, and the unreeling of the linear member 15 is stopped at the timing when the distance between the attachment member 14 of the UAV 1 and the article B becomes equal to a predetermined distance.

Next, the control processing unit 1335 switches from the mode of unreeling the linear member 15 by the unreeling control from the winch control unit 1335d to the mode of unreeling the linear member 15 by an external force (Step S4) and causes the sound output unit 1336 to output a sound indicating the completion of the mode switching (Step S5). As a result, for example, the staff T drags the linear member 15 to make the vertical position of the attachment member 14 of the UAV 1 substantially equal to the vertical position of the connection member Ba of the article B, and the staff T couples the attachment member 14 of the UAV 1 to the connection member Ba of the article B (that is, the staff T attaches the article B to the UAV 1).

Incidentally, after Step S4, in a case where the reel 162 is rotated by gravity acting on the linear member 15 subjected to the unreeling and the attachment member 14 and the linear member 15 is unreeled, the winch control unit 1335d controls the reel drive mechanism 164 to generate a reaction force balanced with the gravity acting on the linear member 15 unreeled by the unreeling length determined in Step S2 and on the attachment member 14. Alternatively, after Step S4, the winch control unit 1335d controls the reel rotation lock mechanism 165 to lock the rotation of the reel 162 (in other words, to lock the unreeling of the linear member) and controls the swing unit 161 to make the winch 16 swingable.

Example 2

Example 2 shows an operation in a case where the unreeling length determination unit 1335c is not necessarily used. Similarly to Example 1, after the UAV 1 lands on the platform 2 and the article B is placed at a predetermined position under the UAV 1, the processing illustrated in FIG. 11 is started in response to, for example, detection of the article B by the optical sensor of the UAV 1 or an unreeling instruction from the staff T.

When the processing illustrated in FIG. 11 is started, the control processing unit 1335 causes the winch control unit 1335d to control the reel drive mechanism 164 to unreel a predetermined length (for example, several centimeters) of the linear member 15 (Step S11). As a result, the drive motor 1643 in the reel drive mechanism 164 is driven, and the predetermined length of the linear member 15 is unreeled from the reel 162.

Next, the control processing unit 1335 causes the information acquisition unit 1335a to acquire distance information indicating a distance between the UAV 1 and the article B measured by the distance sensor (Step S12). Next, the control processing unit 1335 determines whether the distance indicated in the distance information acquired in Step S12 is equal to a predetermined distance (for example, 10 cm) (Step S13). When it is determined that the distance indicated in the distance information is not equal to the predetermined distance (Step S13: NO), the process returns to Step S11. On the other hand, when it is determined that the distance indicated in the distance information is equal to the predetermined distance (Step S13: YES), an unreeling length of the linear member 15 after the start of the processing of FIG. 11 is identified (Step S14), and the process moves to Step S15.

Incidentally, steps S15 and S16 are similar to Steps S4 and S5 illustrated in FIG. 10. Moreover, in a case where the reel 162 is rotated by gravity acting on the linear member 15 subjected to the unreeling and the attachment member 14 and the linear member 15 is unreeled, the winch control unit 1335d controls the reel drive mechanism 164 to generate a reaction force balanced with the gravity acting on the linear member 15 unreeled by the unreeling length determined in Step S14 and on the attachment member 14. Alternatively, as in Example 1, the winch control unit 1335d controls the reel rotation lock mechanism 165 to lock the rotation of the reel 162 and controls the swing unit 161 (swing restrainer drive mechanism 132) to enable the winch 16 to swing.

(2-2. Unreeling Operation of Linear Member 15 by External Force)

Next, an unreeling operation of the linear member 15 by an external force will be described with reference to FIG. 12. FIG. 12 is a flowchart illustrating an exemplary processing of the control processing unit 1335 in the unreeling operation of the linear member 15 by an external force. The processing illustrated in FIG. 12 is started when, for example, a predetermined external force is detected by the force detection sensor 1644 in a state where a distance between the attachment member 14 of the UAV 1 and the article B is equal to a predetermined distance (for example, 10 cm) due to the processing illustrated in FIG. 10 or 11. Incidentally, in a case where the rotation of the reel 162 is locked before the processing illustrated in FIG. 12, when the predetermined external force is detected by the force detection sensor 1644, the reel rotation lock mechanism 165 is controlled to release the lock, and the swing unit 161 is controlled to disable swinging of the winch 16, and then, the processing illustrated in FIG. 12 is started.

When the processing illustrated in FIG. 12 is started, the control processing unit 1335 identifies an unreeling length of the linear member 15 unreeled by the external force (Step S21). Here, the unreeling length of the linear member 15 unreeled by the external force is a length of the linear member 15 further unreeled from the state where the distance between the attachment member 14 of the UAV 1 and the article B is equal to the predetermined distance. For example, the unreeling length of the linear member 15 unreeled by the external force may be identified on the basis of rotation frequency information from the rotation frequency detection sensor or unreeling length information from the unreeling length measurement sensor.

Incidentally, in consideration of the time during which the linear member 15 is pulled by the staff T, the unreeling length is preferably identified after the elapse of a predetermined period of time (for example, several seconds) from the detection of the predetermined external force.

Next, the control processing unit 1335 determines whether the unreeling length identified in Step S21 is equal to or more than a predetermined length (for example, several centimeters) (Step S22). When it is determined that the identified unreeling length is not equal to or more than the predetermined length (for example, several centimeters) (Step S22: NO), the processing in FIG. 12 ends. After the end of the processing, the reel drive mechanism 164 is controlled to generate the reaction force balanced with the gravity acting on the linear member 15 subjected to the unreeling and the attachment member 14. Alternatively, the reel rotation lock mechanism 165 may be controlled to lock the rotation of the reel 162, and the swing unit 161 may be controlled to enable the winch 16 to swing. On the other hand, when it is determined that the identified unreeling length is equal to or more than the predetermined length (for example, several centimeters) (Step S22: YES), the process moves on to Step S23.

In Step S23, the control processing unit 1335 causes the winch control unit 1335d to control the reel drive mechanism 164 to generate a reaction force for reeling the linear member 15. In the control, the winch control unit 1335d outputs to the reel drive mechanism 164 a control signal for slowly reeling the linear member 15 at a predetermined rate or less until a reeling stop command is given. As a result, a state where the reel drive mechanism 164 is controlled to generate the reaction force for reeling the linear member 15 is continued in processes after Step S23 (that is, the state is continued until the unreeling length becomes less than the predetermined length). Incidentally, while the linear member 15 is reeled, the linear member 15 can be unreeled by an external force.

Next, as in Step S21, the control processing unit 1335 identifies an unreeling length of the linear member 15 unreeled by an external force (Step S24). Next, the control processing unit 1335 determines whether the unreeling length identified in Step S24 is less than a predetermined length (for example, several centimeters) (Step S25). When it is determined that the identified unreeling length is less than the predetermined length (that is, the unreeling length is less than the predetermined length due to the reeling of the linear member 15) (Step S25: YES), the control processing unit 1335 outputs a reeling stop command to the reel drive mechanism 164 (Step S26). As a result, the reeling of the linear member 15 by the reel drive mechanism 164 is stopped. The processing in FIG. 12 ends. After the end of the processing, the reel drive mechanism 164 is controlled to generate the reaction force balanced with the gravity acting on the linear member 15 subjected to the unreeling and the attachment member 14. Alternatively, the reel rotation lock mechanism 165 may be controlled to lock the rotation of the reel 162, and the swing unit 161 may be controlled to enable the winch 16 to swing.

When it is determined in Step S25 that the identified unreeling length is not below the predetermined length (Step S25: NO), the process moves on to Step S27. In Step S27, the control processing unit 1335 determines whether the unreeling length of the linear member 15 has changed. For example, the control processing unit 1335 determines whether the unreeling length of the linear member 15 has changed by identifying the variation of the unreeling length of the linear member 15 per unit time.

Alternatively, the control processing unit 1335 may determine whether the magnitude of a force detected by the force detection sensor 1644 is constant for a predetermined period of time. When it is determined that the unreeling length of the linear member 15 has changed (Step S27: YES) or the magnitude of the force detected by the force detection sensor 1644 is not constant for the predetermined period of time, the process returns to Step S24, and the aforementioned processes are repeated. When it is determined that the unreeling length of the linear member 15 has not changed (that is, the variation is "0") (Step S27: NO) or the magnitude of the force detected by the force detection sensor 1644 is constant for the predetermined period of time, the process moves on to Step S28.

In Step S28, the control processing unit 1335 determines whether a predetermined period of time (for example, for 10 seconds) has elapsed from the first process in Step S27. When it is determined that the predetermined period of time has not elapsed (Step S28: NO), the process returns to Step S27, and the aforementioned process is repeated. When it is determined that the predetermined period of time has elapsed (Step S28: YES), the control processing unit 1335 considers (determines) that the attachment of the article B to the attachment member 14 of the UAV 1 is completed and outputs a reeling stop command to the reel drive mechanism 164 (Step S29).

Next, the control processing unit 1335 causes the winch control unit 1335d to control the reel rotation lock mechanism 165, thereby locking the rotation of the reel 162 (Step S30). Next, the control processing unit 1335 causes the winch control unit 1335d to control the swing unit 161 to make the winch 16 swingable (Step S31), thereby ending the processing illustrated in FIG. 12. After the processing of FIG. 12, the control processing unit 1335 again unlocks the reel 162 and controls the winch 16, whereby the linear member 15 is fully reeled to the state before the linear member is unreeled (for example, the state illustrated in FIG. 3). Incidentally, steps S29 to S31 illustrated in FIG. 12 are not necessarily executed. In this case, when it is determined that the predetermined period of time has elapsed (or that the attachment of the article B is completed), the control processing unit 1335 controls the winch 16 to fully reel the linear member 15 to the state before the linear member is unreeled (for example, the state illustrated in FIG. 3).

As described above, according to the embodiments, the control device 133 acquires the distance information indicating the distance between the UAV 1 and the article B positioned under the UAV 1 and controls the winch 16 to unreel the linear member 15 on the basis of the distance indicated in the acquired distance information, thereby enabling the staff T to appropriately attach the article B to the UAV 1. Although articles B of various sizes are handled particularly in spots such as stores and logistics hubs, the embodiment enables the staff T to efficiently and appropriately attach articles B of different heights to the UAV 1.

Incidentally, the above-described embodiment is one embodiment of the present invention, and the present invention is not limited to the above-described embodiment, changes from the above-described embodiment can be made on various configurations and the like within a scope not departing from the gist of the present invention, and such cases shall be also included in the technical scope of the present invention. In the embodiments, the processing illustrated in FIGS. 10 to 12 is performed by the control device 133 mounted on the UAV 1 but may be alternatively performed by the administrative server SA communicating with the UAV 1. In this case, the administrative server SA functions as a control device that controls the winch 16 of the UAV 1, acquires distance information indicating the distance between the UAV 1 and the article B positioned under the UAV 1 from the UAV 1 over the communication network NW, and on the basis of the distance indicated in the acquired distance information, the administrative server SA transmits control information to the UAV 1 for controlling the winch 16 to unreel the linear member 15 of the UAV 1 over the communication network NW. In this case, a control signal to the swing restrainer drive mechanism 132, the reel drive mechanism 164, or the reel rotation lock mechanism 165 is preferably transmitted from the administrative server SA via the control processing unit 1335 of the UAV 1. Moreover, the embodiments describes an UAV as an example of the unmanned aerial vehicle, but the invention is also applicable to a flying robot or the like as an example of the unmanned aerial vehicle.

REFERENCE SIGNS LIST

1 UAV
2 Platform
11 Rotor unit
12 Legs
13 Body
14 Attachment member
15 Linear member
16 Winch
111 Rotors
112 Rotor drive mechanisms
131 Swing restrainer
132 Swing restrainer drive mechanism
133 Control device
134 Battery
135 Ball bearing
161 Swing unit
162 Reel
163 Rotating shaft
164 Reel drive mechanism
165 Reel rotation lock mechanism
166 Casing
167 Guide member
168 Rod
169 Bearing
1321 Hollow acceptor
1331 Positioning unit
1332 Communication unit
1333 Sensor unit
1334 Storage unit
1335 Control processing unit
1335a Information acquisition unit
1335b Flight control unit
1335c Unreeling length determination unit
1335d Winch control unit
1336 Sound output unit
1611 Ball
1612 Support
1631 Engagement member
1641,1642 Gear
1643 Drive motor
1644 Force detection sensor
1651 Rotator
1652 Rotation restrainer
1653 Hollow acceptor
SA Administrative server

What is claimed is:

1. A control device configured to control a winch of an unmanned aerial vehicle including an attachment member capable of attaching to an article, a linear member connected to the attachment member, and the winch capable of unreeling and reeling the linear member, the control device comprising:
    at least one memory configured to store program code; and at least one processor configured to access the program code and operate as instructed by the program code, the program code including:
    acquisition code configured to cause the at least one processor to acquire distance information indicating a distance between the unmanned aerial vehicle and the article positioned under the unmanned aerial vehicle;
    detection code configured to cause the at least one processor to detect an external force; and
    control code configured to cause the at least one processor to control the winch to unreel the linear member on the basis of the distance indicated in the distance information,
    wherein the control code is further configured to cause the at least one processor to, in a state where a distance between the attachment member and the article or a connection member provided on the article is equal to a predetermined distance, control the winch to generate a reaction force for reeling the linear member in response to detecting the external force when the linear member is further unreeled by an external force.

2. The control device according to claim 1, the program code further including determination code configured to cause the at least one processor to determine an unreeling length of the linear member on the basis of the distance indicated in the distance information,
    wherein the control code causes the at least one processor to control the winch to unreel the linear member according to the determined unreeling length.

3. The control device according to claim 1, wherein the acquisition code causes the at least one processor to acquire the distance information more than once in a time series, and
    the control code causes the at least one processor to control the winch to unreel the linear member until a time when the distance indicated in the distance information becomes equal to a predetermined distance.

4. The control device according to claim 1, wherein the control code causes the at least one processor to, in the state where the distance between the attachment member and the article or the connection member provided on the article is equal to the predetermined distance, control the winch to generate a reaction force balanced with gravity acting on the linear member subjected to the unreeling and on the attachment member.

5. The control device according to claim 1, wherein the reaction force for reeling the linear member is larger than gravity acting on the linear member subjected to the unreeling and on the attachment member.

6. The control device according to claim 1, wherein the control code causes the at least one processor to control the winch to lock the unreeling of the linear member when the distance between the attachment member and the article or the connection member provided on the article reaches the predetermined distance.

7. The control device according to claim 6, wherein the control code causes the at least one processor to, in a state where the unreeling of the linear member is locked, and when a predetermined external force is detected by an external force detector included in the unmanned aerial vehicle, control the winch to release the lock and controls the winch to generate a reaction force equal to or more than gravity acting on the linear member subjected to the unreeling and on the attachment member.

8. The control device according to claim 7, wherein the control code causes the at least one processor to, when the linear member is further unreeled by an external force after releasing the lock, control the winch to generate the reaction force until the distance between the attachment member and the article or the connection member provided on the article returns to the predetermined distance and lock the unreeling of the linear member when the distance returns to the predetermined distance.

9. The control device according to claim 1, wherein the control code causes the at least one processor to control the winch to unreel the linear member until a vertical position of the attachment member corresponds to a vertical position of a connection member provided on the article on the basis of the distance indicated in the distance information.

10. The control device according to claim 9, wherein the control code causes the at least one processor to, in a state where the vertical position of the attachment member corresponds to the vertical position of the connection member provided on the article, control the winch to generate a reaction force balanced with gravity acting on the linear member subjected to the unreeling and on the attachment member.

11. The control device according to claim 9, wherein the control code causes the at least one processor to control the winch to lock the linear member to prevent unreeling when the vertical position of the attachment member corresponds to the vertical position of the connection member provided on the article.

12. The control device according to claim 1, wherein the control code causes the at least one processor to, in a state where the winch is controlled to generate the reaction force, control the winch to lock the unreeling of the linear member when an unreeling length of the linear member does not change for a predetermined period of time.

13. The control device according to claim 12,
wherein the winch includes an attachment portion to be attached to the unmanned aerial vehicle,
the winch being attached to the unmanned aerial vehicle with the attachment portion as a fulcrum so as to be swingable or non-swingable by the external force, and
the control code causes the at least one processor to, a state where the winch is unable to swing by the external force, control the attachment portion to enable the winch to swing when the unreeling of the linear member is locked.

14. The control device according to claim 1,
wherein the winch includes an attachment portion to be attached to the unmanned aerial vehicle,
the winch being attached to the unmanned aerial vehicle with the attachment portion as a fulcrum so as to be swingable or non-swingable by the external force, and
the control code causes the at least one processor to:
in a state where the linear member is able to be unreeled by the external force, control the attachment portion to disable swinging of the winch; and
in a state where the linear member is unable to be unreeled by the external force, control the attachment portion to enable the winch to swing.

15. The control device according to claim 1, wherein the distance indicated in the distance information is a distance between the attachment member and the article or a connection member provided on the article.

16. The control device according to claim 1, wherein the acquisition code causes the at least one processor to acquire information indicating a height of the article and a height of the unmanned aerial vehicle relative to a placement surface where the article is placed and acquire the distance information on the basis of each of the heights.

17. The control device according to claim 1, wherein the unmanned aerial vehicle includes a sensor configured to measure the distance, and
the acquisition code causes the at least one processor to acquire the distance information from the sensor.

18. An unmanned aerial vehicle comprising:
an attachment member capable of attaching to an article;
a linear member connected to the attachment member;
a winch capable of unreeling and reeling the linear member;
at least one memory configured to store program code; and at least one processor configured to access the program code and operate as instructed by the program code, the program code including:
acquisition code configured to cause the at least one processor to acquire distance information indicating a distance between the unmanned aerial vehicle and the article positioned under the unmanned aerial vehicle;
detection code configured to cause the at least one processor to detect an external force; and
control code configured to cause the at least one processor to control the winch to unreel the linear member on the basis of the distance indicated in the distance information-,
wherein the control code is further configured to cause the at least one processor to, in a state where a distance between the attachment member and the article or a connection member provided on the article is equal to a predetermined distance, control the winch to generate a reaction force for reeling the linear member in response to detecting the external force when the linear member is further unreeled by an external force.

19. A control method executed by a computer for controlling a winch of an unmanned aerial vehicle including an attachment member capable of attaching to an article, a linear member connected to the attachment member, and the winch capable of unreeling and reeling the linear member, the control method comprising:
acquiring distance information indicating a distance between the unmanned aerial vehicle and the article positioned under the unmanned aerial vehicle;

detecting an external force;
controlling the winch to unreel the linear member on the basis of the distance indicated in the distance information; and
in a state where a distance between the attachment member and the article or a connection member provided on the article is equal to a predetermined distance, controlling the winch to generate a reaction force for reeling the linear member in response to detecting the external force when the linear member is further unreeled by an external force.

* * * * *